(12) United States Patent
Cammarata et al.

(10) Patent No.: US 12,540,734 B2
(45) Date of Patent: Feb. 3, 2026

(54) MULTI-FUNCTION COOKTOP SLIDER CONTROLS

(71) Applicant: WHIRLPOOL CORPORATION, Benton Harbor, MI (US)

(72) Inventors: Marco Cammarata, Besozzo (IT); Priscilla Rosaria Conforti, Montalto Uffugo (IT); Andrea Gallivanoni, Casorate Sempione (IT); Andrea Gasparoni, Comerio (IT); Annalisa Pacioni, Bresso (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 151 days.

(21) Appl. No.: 18/178,324

(22) Filed: Mar. 3, 2023

(65) Prior Publication Data

US 2024/0295325 A1    Sep. 5, 2024

(51) Int. Cl.
   *F24C 7/08*       (2006.01)
   *G06F 3/04847*    (2022.01)
   *G06F 3/0488*     (2022.01)

(52) U.S. Cl.
   CPC .......... *F24C 7/086* (2013.01); *G06F 3/04847* (2013.01); *G06F 3/0488* (2013.01)

(58) Field of Classification Search
   CPC ...... F24C 7/086; G06F 3/048; G06F 3/04847; G06F 3/0488–04886
   See application file for complete search history.

(56) References Cited

U.S. PATENT DOCUMENTS

| | | | |
|---|---|---|---|
| 2011/0148773 A1 | 6/2011 | Rudolph | |
| 2014/0353302 A1* | 12/2014 | Berr | H03K 17/9618 |
| | | | 219/443.1 |
| 2016/0320068 A1* | 11/2016 | Koehler | F24C 7/086 |
| 2017/0023255 A1* | 1/2017 | Bach | F24C 7/086 |
| 2017/0135159 A1 | 5/2017 | Sorenson et al. | |
| 2017/0238749 A1 | 8/2017 | Vengroff et al. | |
| 2017/0292712 A1* | 10/2017 | Alexander | G06F 3/016 |
| 2018/0128493 A1 | 5/2018 | Chen et al. | |
| 2018/0209658 A1* | 7/2018 | Holzinger | F24C 7/083 |

(Continued)

FOREIGN PATENT DOCUMENTS

| | | |
|---|---|---|
| CN | 111023178 A | 4/2020 |
| DE | 102018213655 A1 | 2/2020 |

(Continued)

*Primary Examiner* — Liang Y Li
(74) *Attorney, Agent, or Firm* — BROOKS KUSHMAN P.C.

(57) ABSTRACT

A user interface having a multi-function slider control of a cooktop is provided. The slider control includes an array of individually controllable light elements defining a scale and is configured to be touch sensitive to receive selection of a value along the scale. A numeric display is provided complementary to the slider control. In a first mode, the value is displayed along the scale using the array of individually controllable light elements to provide visual feedback of the selection. In a second mode, a progress bar is displayed indicating progress from a first value to a second value using the array of individually controllable light elements In a third mode, up and down controls are displayed using the array of individually controllable light elements to provide fine-tune adjustment to the value.

20 Claims, 20 Drawing Sheets

(56) References Cited

U.S. PATENT DOCUMENTS

2021/0164662 A1\* 6/2021 Hedenblad .............. F24C 7/083
2021/0223923 A1\* 7/2021 Carre ...................... H04L 41/40
2022/0397277 A1\* 12/2022 Westman ................ F24C 7/046

FOREIGN PATENT DOCUMENTS

| EP | 2767761 A2 | 8/2014 |
|---|---|---|
| EP | 2995866 A1 | 3/2016 |
| EP | 3285547 A1 | 2/2018 |
| EP | 3612002 B1 | 3/2022 |
| JP | 201733564 A | 2/2017 |
| WO | 2021008886 A1 | 1/2021 |
| WO | 2021015691 A1 | 1/2021 |

\* cited by examiner

MULTI-FUNCTION COOKTOP SLIDER CONTROLS

TECHNICAL FIELD

Aspects of the present disclosure generally relate to a multi-function slider control user interface.

BACKGROUND

Induction cooking appliances use induction coils to heat items directly. In such an appliance, an electric current is passed through a coil underneath the cooking surface, creating a magnetic current throughout a pot or pan to produce heat. As opposed to other types of cooking appliances, the surface of induction cooking appliances stays relatively cool while maintaining a consistent temperature on pots and pans and delivering power with a higher efficiency.

Induction cooktops may be equipped with slider controls. These controls may be provided on a control panel of the cooktop. The slider controls may allow the user to set the cooktop power level by tapping or sliding the user's finger to the desired level.

SUMMARY

In one or more illustrative examples, a method is performed for displaying a user interface having a multi-function slider control of a cooktop and a numeric display complementary to the slider control, the slider control comprising an array of individually controllable light elements defining a scale, the slider control being configured to be touch sensitive to receive selection of a value along the scale, the method comprising in a first mode, displaying the value along the scale using the array of individually controllable light elements and numerically on the numeric display to provide visual feedback of the selection; and in a second mode, displaying a progress bar indicating progress from a first value to a second value using the array of individually controllable light elements and further displaying the progress numerically on the numeric display.

In one or more illustrative examples, a multi-function slider control user interface for a cooktop includes a slider control, comprising an array of individually controllable light elements defining a scale, wherein the slider control is configured to be touch sensitive to receive selection of a value along the scale; a numeric display complementary to the slider control; and a controller, configured to in a first mode, display the value along the scale using the array of individually controllable light elements and numerically on the numeric display to provide visual feedback of the selection, and in a second mode, display a progress bar indicating progress from a first value to a second value using the array of individually controllable light elements and further display the progress numerically on the numeric display.

In one or more illustrative examples, a non-transitory computer-readable medium includes instructions that, when executed by a controller of a cooktop, cause the controller to control a slider control and a numeric display complementary to the slider control, the slider control comprising an array of individually controllable light elements defining a scale and configured to be touch sensitive to receive selection of a value along the scale, to perform operations including to, in a first mode, display the value along the scale using the array of individually controllable light elements and numerically on the numeric display to provide visual feedback of the selection; in a second mode, display a progress bar indicating progress from a first value to a second value using the array of individually controllable light elements and further display the progress numerically on the numeric display; and in a third mode, display up and down controls using the array of individually controllable light elements to provide fine-tune adjustment to the value.

DETAILED DESCRIPTION

Figure 1:
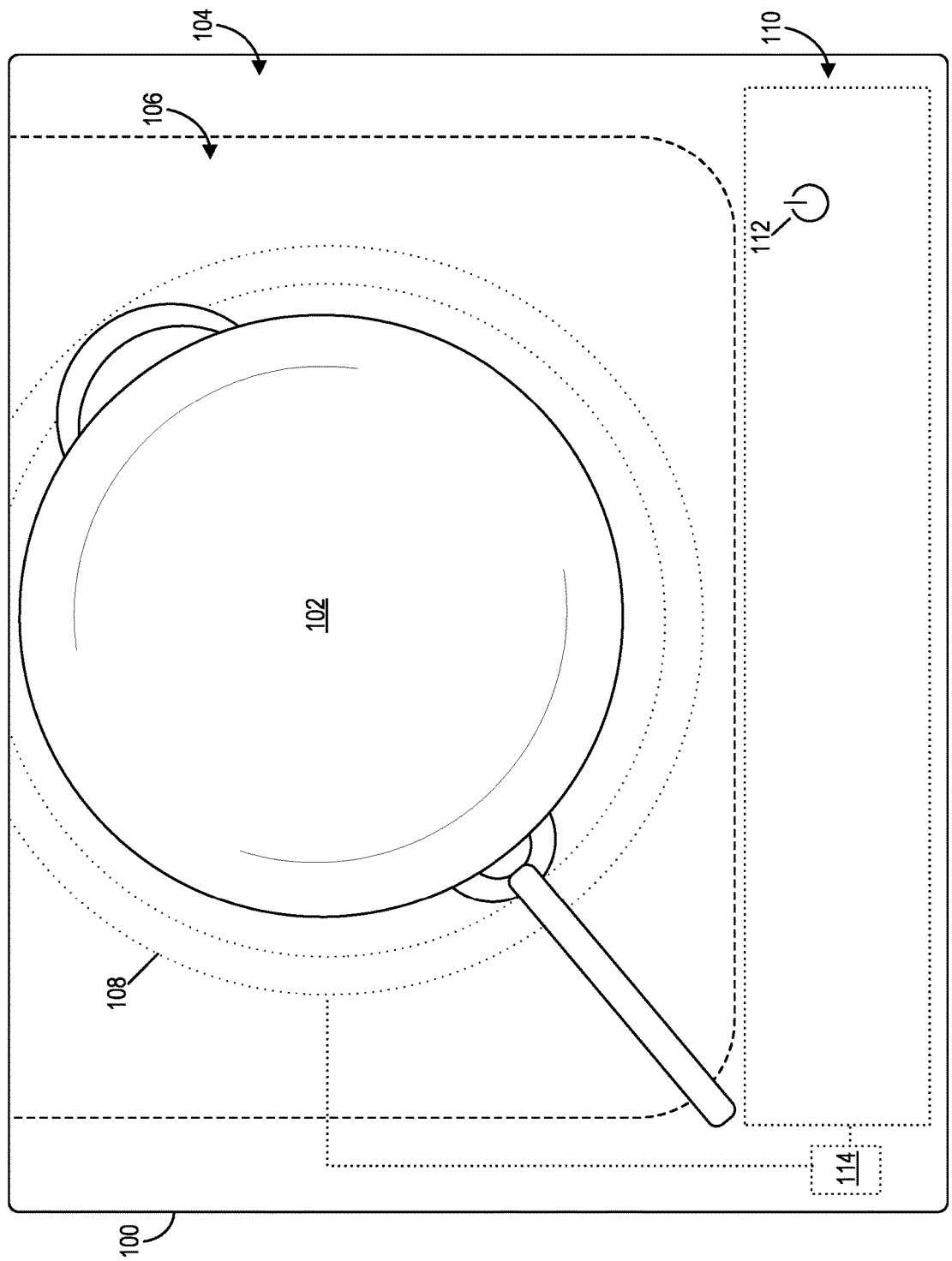
FIG. 1 illustrates a top view of an induction cooktop in an unpowered state.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

During user interactions with a cooktop, some preparation or cooking operations take a considerable amount of time. For instance, it may take time for a pot of water to boil. During this time, users may wait for the completion of the operation, without being directly engaged in activities with the cooktop. Instead, the users may dedicate their time to other activities. These other activities may be related to the cooking process being carried out (e.g., preparation of ingredients, stirring, etc.), or unrelated activities (e.g., watching television, using their phone, etc.).

The cooktop may indicate in its instructions for use (IFUs) that a particular operation will take a certain amount of time. Or the cooktop may provide a visual indication on the cooktop of the remaining time. Absent such techniques, the user may generally be unaware of the time the cooktop will take to complete the operation.

The display of a visual indication of the progress is important in cooktops. Yet, cooktops typically lack a dynamic user interface screen in their user interface and therefore cannot show information to the user besides what is available with fixed graphics. Some cooktops include additional multiple-digit displays to provide countdown information. However, these additional user interface elements increase the cost of the cooktop and also require additional user interface space in the control area. Other cooktops may include network connectivity to allow for progress to be displayed on the user's smartphone. However, the willingness on the part of the user to resort to their smartphone may be considered a pain point in the user interface, and in any event such techniques also require an Internet connection as well as associated components.

An improved cooktop may offer progress tracking indications to users by reusing the existing slider control to implement a progress bar. This slider control may include a linear array of light emitting diode (LED) elements in combination with touch functionality. Traditionally, sliders are well-known and used to set a power level, for example from 1 to 9, each level corresponding to a predetermined power in Watts. These user interface elements may be reused in a different context: when a temperature control function is activated, the slider is still an input interface element, but in this context it may be used to set a temperature, e.g., in ° C., as opposed to in Wattage level. When in the temperature mode, the slider controls may allow the user to set the cooktop temperature by tapping or sliding the user's finger across the control to the desired temperature. A numeric display may be provided complementary to the slider control, where the numeric display mirrors the value being selected by the slider control. When the user is not making a selection, the slider control may be repurposed to display a progress bar for the current operation. This may allow for a progress indication to be provided in the existing user interface, without resorting to costly additional displays, without taking over the numerical displays, and without delegating to an app on a smartphone.

FIG. 1 illustrates a top view of an induction cooktop 100 in an unpowered state. The induction cooktop 100 may be configured to generate an electromagnetic field to rapidly and directly heat a cooking utensil 102 placed thereon. The cooking utensil 102 may be any type of cooking vessel or other cooking item configured to conduct and withstand high heat, such as a pot, pan, griddle, etc. The cooking utensil 102 may be composed of a highly magnetic metal containing iron, such as stainless-steel. However, other highly magnetic metals may additionally or alternately be used.

The induction cooktop 100 may include a cooktop surface 104 for receiving the cooking utensil 102. The cooktop surface 104 may be formed of glass, ceramic, or another high-heat resistant surface. One or more cooking areas 106 may be indicated on the cooktop surface 104. These indications may serve to indicate to the user where cooking utensils 102 may be placed on the cooktop surface 104.

One or more induction coils 108 may be arranged below each cooking area 106. The induction coils 108 may be a copper coil or another material suitable for electric flux (such as aluminum, copper clad aluminum, etc.). The induction coils 108 may be configured to receive electrical current from a power source. The power source may supply high frequency alternating current (AC) to the induction coil 108 to generate the magnetic flux, creating an electromagnetic field that causes electrons to vibrate within the cooking utensil 102. The vibrating electrons create heat, thus heating the bottom surface of the cooking utensil 102. The cooking utensil 102 may then heat the contents of the cooking utensil 102 through conductive heat.

The induction cooktop 100 further includes a control panel 110 for controlling the power applied to the induction coil 108. Although shown as integrated with the cooktop surface 104, the control panel 110 may be separate from the cooktop surface 104 in other examples. The control panel 110 may include various controls for activating and controlling the induction coils 108 within the cooking areas 106.

The control panel 110 may include markings etched into or otherwise provided on the cooktop surface 104. These markings may display various information regardless of whether the induction cooktop 100 is powered on. As shown, a power button 112 is provided as a marking on the cooktop surface 104. This allows the user to easily identify the location of the power button 112 regardless of whether the induction cooktop 100 is powered on. The general area of the control panel 110 within the example control panel 110 is shown in FIG. 1 to illustrate the placement of the control panel 110; this internal area may not be visible from outside of the induction cooktop 100

The control panel 110 may also include various LEDs or other lights below the cooktop surface 104. These lights may be powered on to provide illuminated indications visible through the induction cooktop 100. The lights may also be powered off to refrain from showing the indications. In some cases, the lights may be illuminated at different power levels to adjust the brightness of the displayed information. By using illuminated controls that are only visible when lit, the surface of the control panel 110 may remain relatively uncluttered.

The control panel 110 may also include input controls that may be manipulated by the user to provide input to the induction cooktop 100. In an example the control panel 110 may define a touch panel or one or more touch-sensitive buttons that may be pressed by the user to provide commands to the induction cooktop 100.

The induction cooktop 100 may further include a controller 114. The controller 114 may be any of various computing devices configured to receive input from the control panel 110, control the illumination of the controls of the control panel 110, and control the power applied to the induction coils 108 of the cooking areas 106. The controller 114 is shown in FIG. 1 to illustrate the connection of the controller 114 to the control panel 110 and the induction coils 108, however the controller 114 may generally not be visible from the outside of the induction cooktop 100. The user interface display operations discussed herein may accordingly be performed under the control of the controller 114.

Figure 2:
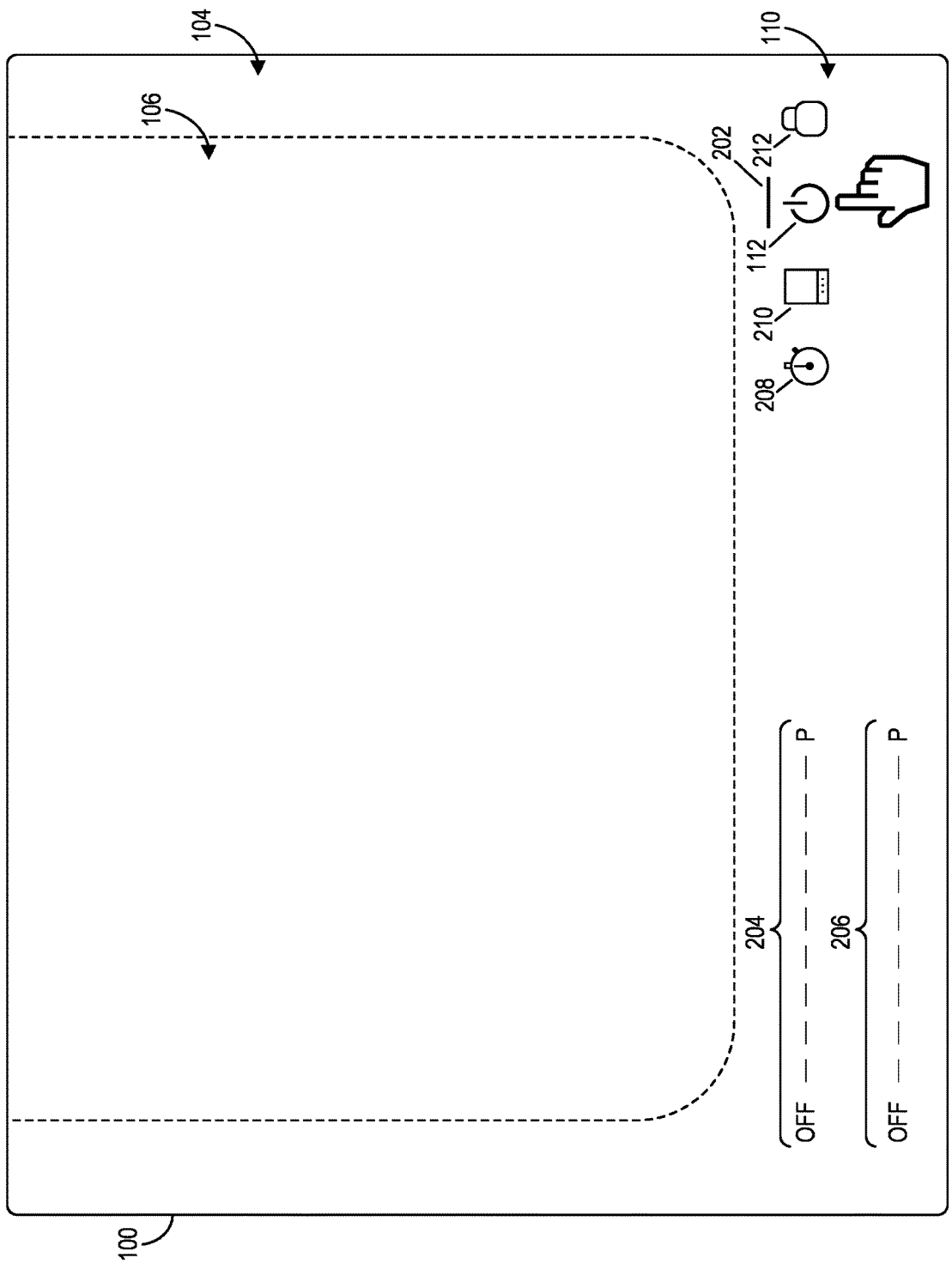
FIG. 2 illustrates a top view of the induction cooktop in the powered state, before a cooking utensil is placed on the cooktop surface.

FIG. 2 illustrates a top view of the induction cooktop 100 in the powered state, before a cooking utensil 102 is placed on the cooktop surface 104. Here, the power button 112 shown in FIG. 1 has been pressed by a user to activate the induction cooktop 100. For example, the power button 112 may be pressed by the user for a predetermined period of time to cause the controller 114 to turn the induction cooktop 100 to turn on.

The power button 112 may be illuminated from below to indicate that the induction cooktop 100 is now on. The power button 112 is shown in a thicker line to indicate the backlighting. In addition, a power indication 202 may be shown in the vicinity of the power button 112 to emphasize the powered state. The power indication 202 is shown as an illuminated bar above the power button 112, but this is only an example and other indications to show the powered state may be used.

As the induction cooktop 100 is powered, additional controls may be backlit so as to become visible. These additional controls may include slider controls 204, 206 for controlling the cooking areas 106. These controls may also include a timer control 208 and a lock control 212, for example.

The slider controls 204, 206 may be touch sensitive controls that allow the user to choose or set a value along a scale. This may be done by the user tapping or sliding the user's finger to the desired power level. In one example, the value to be set may be a power level. In another example, the value to be set may be a temperature. In another example, the value to be set may be a timeout.

In addition to being touch-sensitive, the slider controls 204, 206 may additionally include an array of light elements. Here, the array is shown as an array of nine individual horizontal bar elements, although arrays of more or fewer or differently designed elements may be used. Each element of the array may be individually controllable, such that the intensity of the backlight for each element may be separately set by the controller 114. In some implementations, the controller 114 may be configured to control each of the LEDs at two different levels of brightness, i.e., each of the LEDs can be in one of three states: off, dim, and bright. The slider controls 204, 206 may further include labels at either end to indicate the boundaries of the range, here shown as OFF at the lower end and as P at the upper end. It should be noted that these slider controls 204, 206 are merely examples, and differently shaped arrays, array elements, and labels may be used.

In some induction cooktops 100, each cooking area 106 may have its own corresponding control. In this illustration, the induction cooktop 100 has two cooking areas 106, the first of which is controllable via the slider control 204, the second of which is controllable via the slider control 206. It should be noted that in other examples, the induction cooktop 100 may have more or fewer cooking areas 106 as well as more or fewer corresponding slider controls 204, 206.

The timer control 208 may be selectable by the user to set a timer. The timer may countdown until zero, at which time an alert may be sounded. In some induction cooktop 100, the timer may additionally or alternatively shut off the induction coil 108 in the associated cooking area 106. This may allow the user to select to turn off a cooking area 106 once the timer elapses. Responsive to selection of the timer control 208, one or more of the slider controls 204, 206 may be used to allow the user to set the amount of time on the timer. Additionally, as discussed below, when in the timer mode, the array elements of the slider controls 204, 206 may be used to visually illustrate the remaining time on the timer.

The level control 210 may be selectable by the user to set cooking parameters of the induction cooktop 100. For example, the slider controls 204, 206 may be used to set the power level or the cooktop temperature of the respective cooking areas 106, as noted above. Additionally, as discussed below, when in the cooking mode the array elements of the slider controls 204, 206 may be used to visually illustrate the current temperature or power level of the corresponding cooking areas 106.

The lock control 212 may be selectable by the user to lock out the control panel 110. Once locked, a predefined sequence may be required to be entered into the control panel 110 to re-enable use of the control panel 110. In some induction cooktops 100, the control panel 110 may only be locked when the induction cooktop 100 is not in operation.

Figure 3:
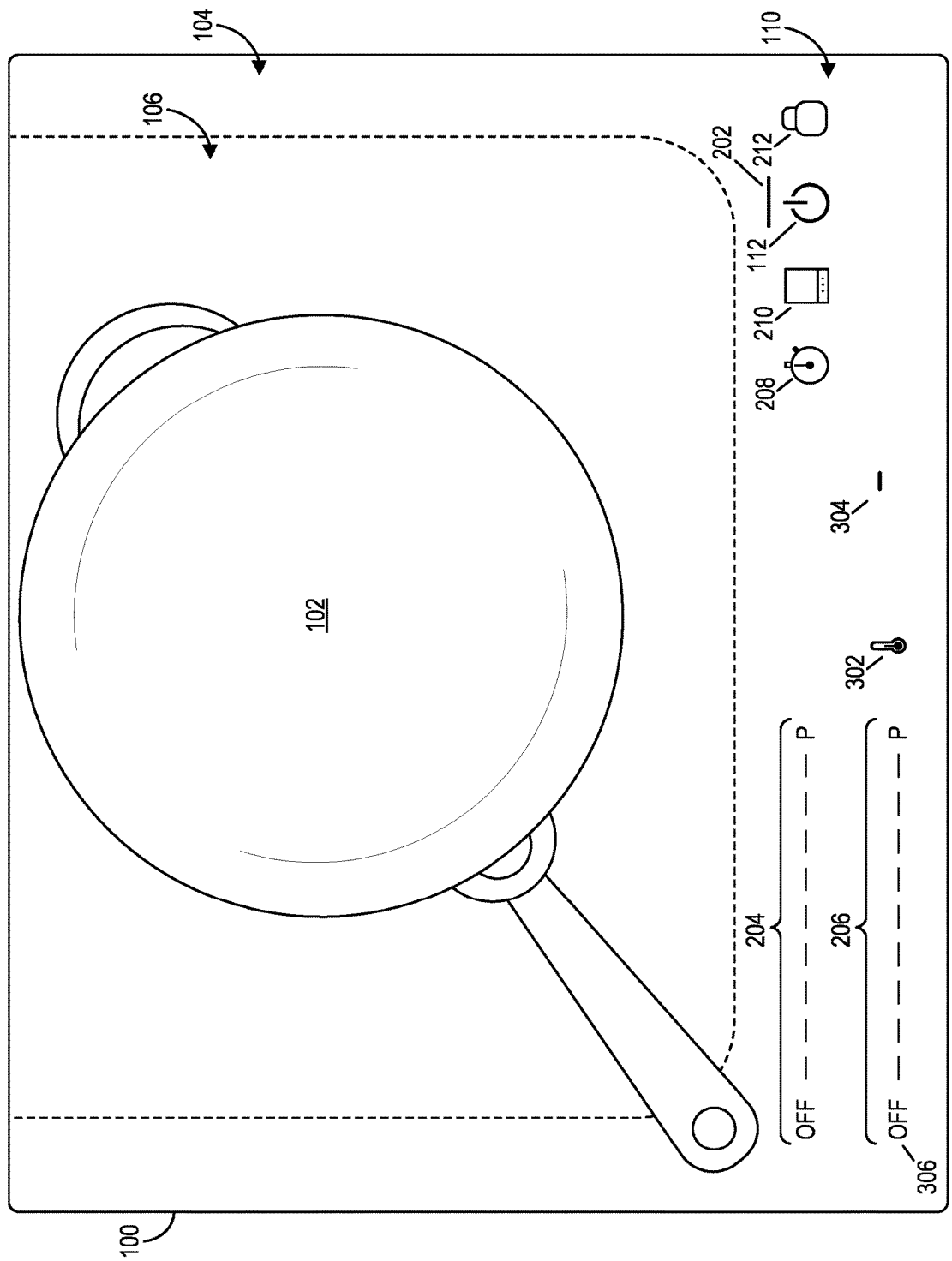
FIG. 3 illustrates a top view of the induction cooktop in the powered state, after the cooking utensil is placed on the cooktop surface.

FIG. 3 illustrates a top view of the induction cooktop 100 in the powered state, after the cooking utensil 102 is placed on the cooktop surface 104. As shown, the control panel 110 is updated to indicate the presence of the cooking utensil 102. For instance, the slider control 206 may be indicated in a brighter level of illumination as compared to the other slider control 204 to indicate that the cooking utensil 102 has been detected in the zone controlled by the slider control 206. Also as the cooking utensil 102 is detected, various controls may be illuminated to indicate that they may receive selection. These controls may include a temperature control 302, which may be used to toggle whether the slider controls 204, 206 are used to select power level or temperature. Additionally, a numeric display 304 is illuminated to be used to indicate numeric information related to the operation of the induction cooktop 100.

Figure 4:
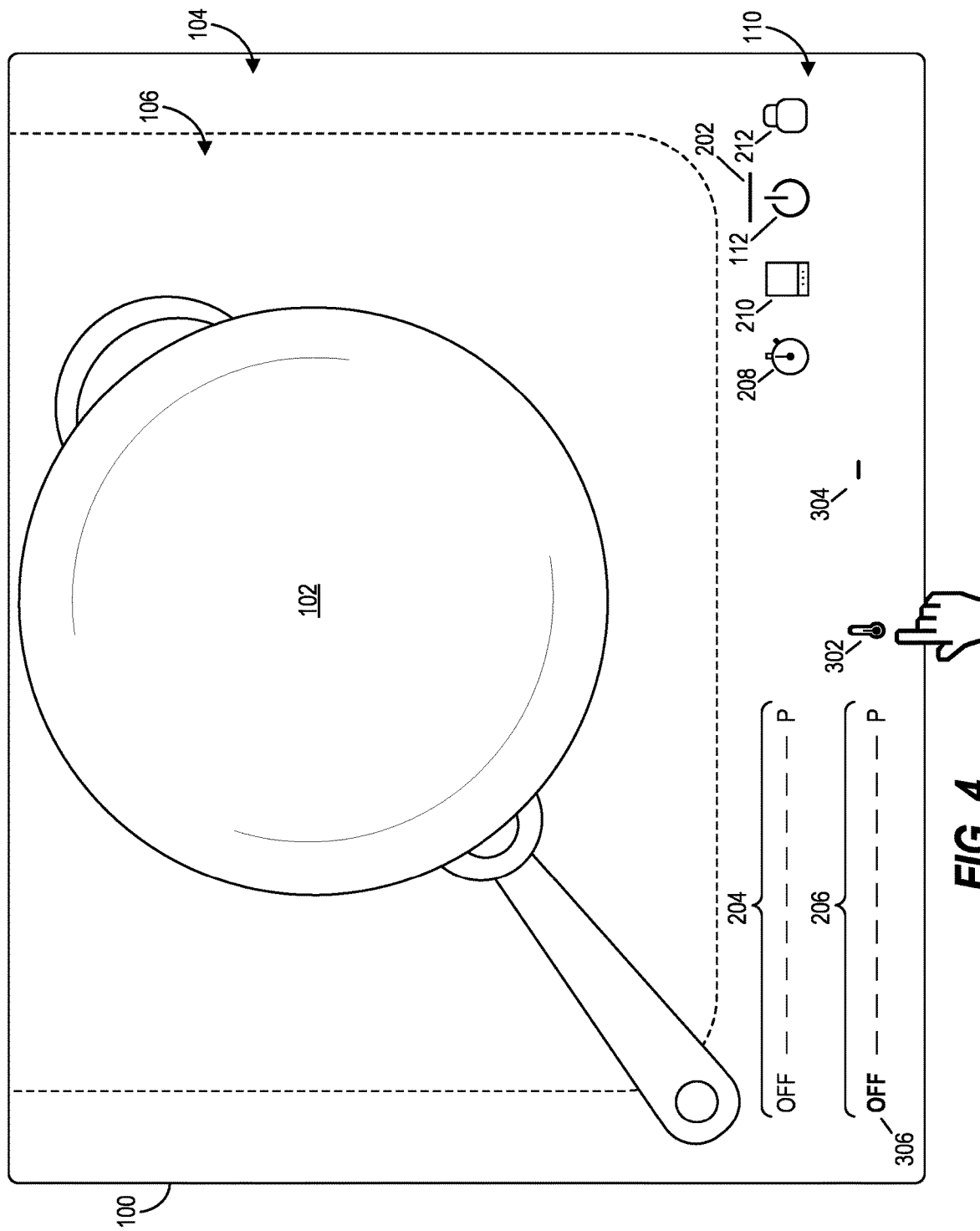
FIG. 4 illustrates a top view of the induction cooktop in the powered state, after the cooking area for the cooking utensil has been activated in temperature mode.

FIG. 4 illustrates a top view of the induction cooktop 100 in the powered state, after the cooking area 106 for the cooking utensil 102 has been activated. As shown, the user has selected the temperature control 302. As indicated by the bold text, the temperature control 302 has been illuminated to a brighter level to indicate to the user that the cooktop is now in temperature control mode, not power level selection mode. Additionally, the slider control 206 is updated to indicate a current status 306 of the cooking area 106, specifically that the cooking area 106 is OFF as indicated by the bolding of that portion of the slider control 206.

Figure 5A:
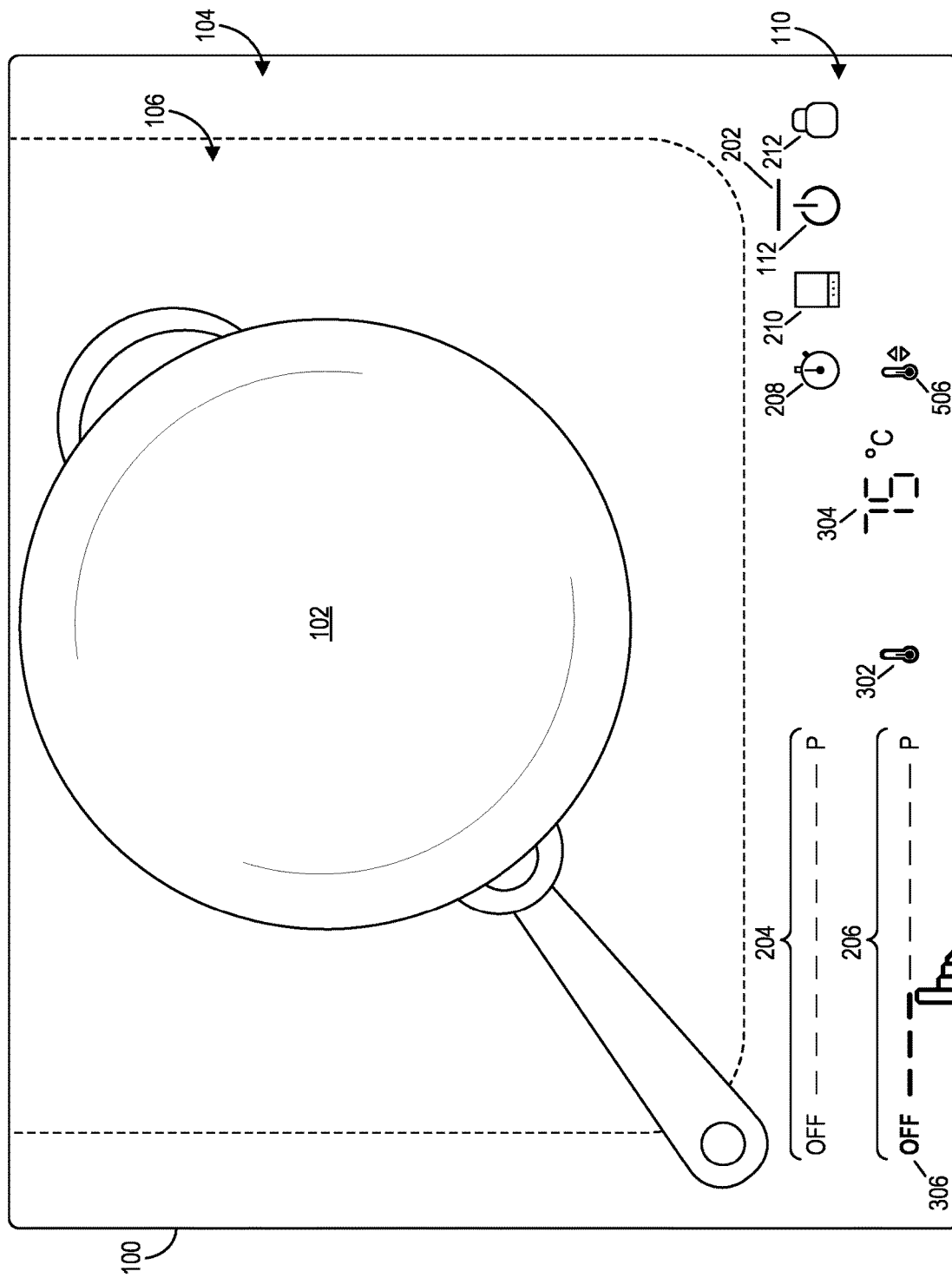
FIG. 5A illustrates a first top view of the induction cooktop in the powered and active state, in which the user is selecting a temperature using the slider control.
Figure 5B:
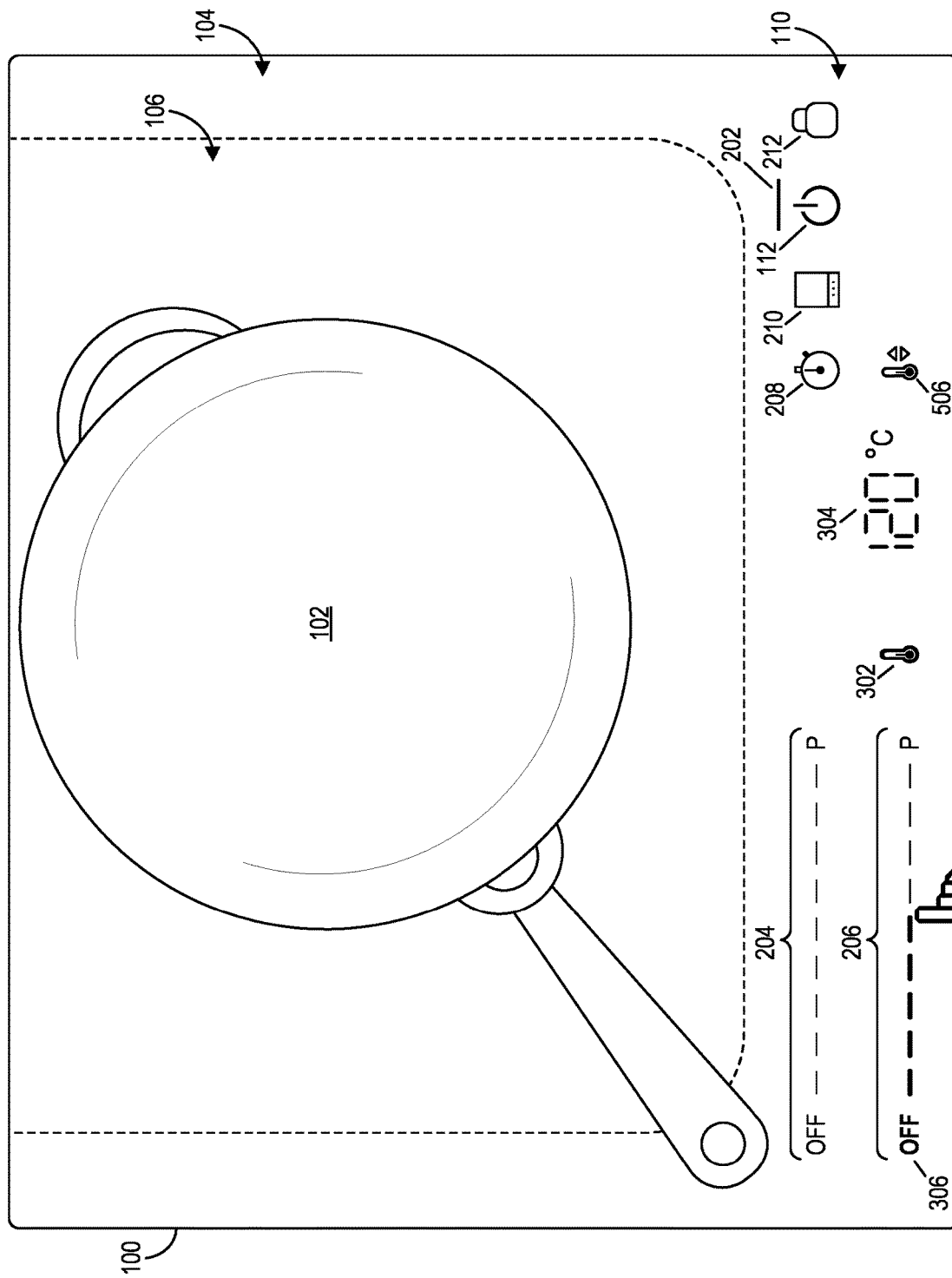
FIG. 5B illustrates a second top view of the induction cooktop in the powered and active state, in which the user is continuing to select the temperature using the slider control.

FIGS. 5A-5B collectively illustrate a top view of the induction cooktop 100 in the powered and active state, in which the user is selecting a temperature using the slider control 206. Referring to FIG. 5A, the user is sliding a finger along the touch-sensitive slider control 206 to select the desired temperature for the cooking utensil 102. The temperature may be selected from the range of OFF to the maximum temperature of the induction cooktop 100.

The array of elements of the slider control 206 may update to indicate the current position of the finger. For instance, as shown by the current status 306, the elements of the array to the left of the finger may be illuminated at a brighter level than the elements to the right of the finger. This gives the user immediate feedback with respect to temperature being controlled. The temperature that is being selected may also be visually represented in the numeric display 304. As shown by the numeric display 304, the selected target temperature is 75 degrees Celsius. The numeric display 304 may accordingly update as the user slides the finger along the slider control 206.

It should be noted that additional controls may also be illuminated responsive to activation of the cooking area 106. These may include a fine-tune adjustment mode 506 that allows for precise setting of the temperature or other value. In an example, the fine-tune adjustment mode 506 may allow the user to perform discrete step up and step down adjustments to the current temperature setting. The fine-tune adjustment mode 506 is discussed in detail with respect to FIGS. 7A-7F. These may also include direct access modes (not shown) such as a boil mode, a simmer mode, a fry mode, a melt mode, and the like which may be available to help the user in automatically setting and maintaining the appropriate temperature for a specific cooking method without necessarily knowing it.

FIG. 5B illustrates a top view of the induction cooktop 100 in the powered and active state, in which the user is continuing to select the temperature using the slider control 206. Here, the user has continued to adjust the temperature level upward, which is now up to 120 degrees Celsius, as compared to 75 degrees in FIG. 5A. Once the selection is complete (e.g., by the user removing the finger from the control panel 110, or after a predetermined time is elapsed without the user interacting with the control 206), the induction cooktop 100 may begin to preheat the cooking utensil 102 to the entered temperature.

FIGS. 6A-6F collectively illustrate a top view of the induction cooktop 100 showing a preheat function making use of the current status 306 of the slider control 206 and the numeric display 304. In general, the preheat function of the induction cooktop 100 works by rapidly heating the cooking utensil 102 to the entered temperature. This preheat function may be an example of using the slider controls 204, 206 as progress bars.

During the preheating, the control panel 110 may utilize the numeric display 304 to illustrate the progress to the desired temperature. For instance, the numeric display 304 may periodically switch between the current temperature of the cooking utensil 102 and displaying "Pre" to indicate preheating is taking place. In an example, the numeric display 304 may periodically switch between displaying "Pre" and displaying the current temperature of the cooking utensil 102. Once the desired temperature is reached, the induction cooktop 100 may alert the user, such as with a beep or a light indication, to inform the user that the preheating is complete, and may discontinue showing "Pre" on the numeric display 304 and finally show the achieved temperature setpoint.

Figure 6A:
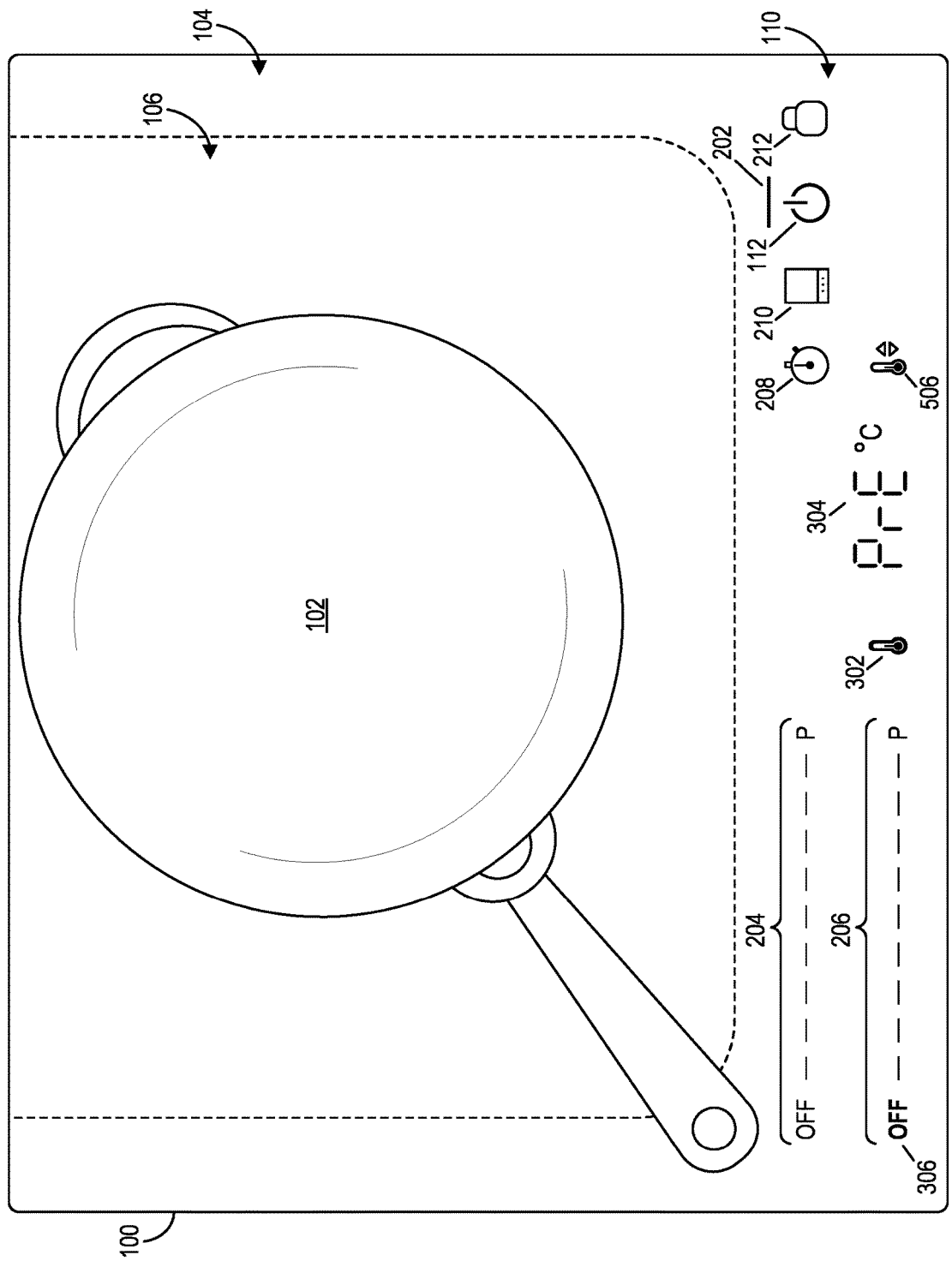
FIG. 6A illustrates a first top view of the induction cooktop showing a preheat function making use of the current status of the slider control and the numeric display.
Figure 6B:
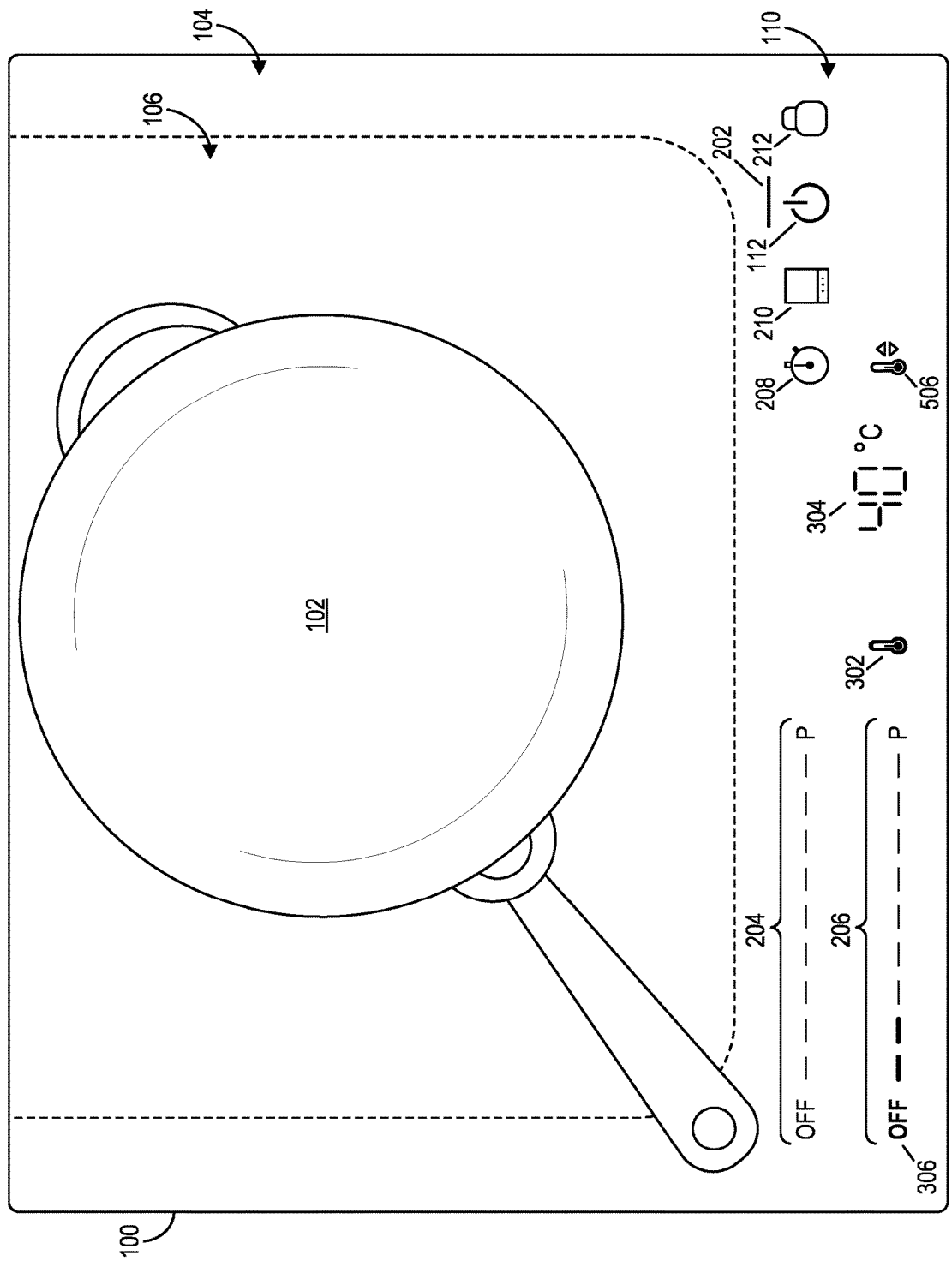
FIG. 6B illustrates a second top view of the induction cooktop showing a preheat function making use of the current status of the slider control and the numeric display.
Figure 6C:
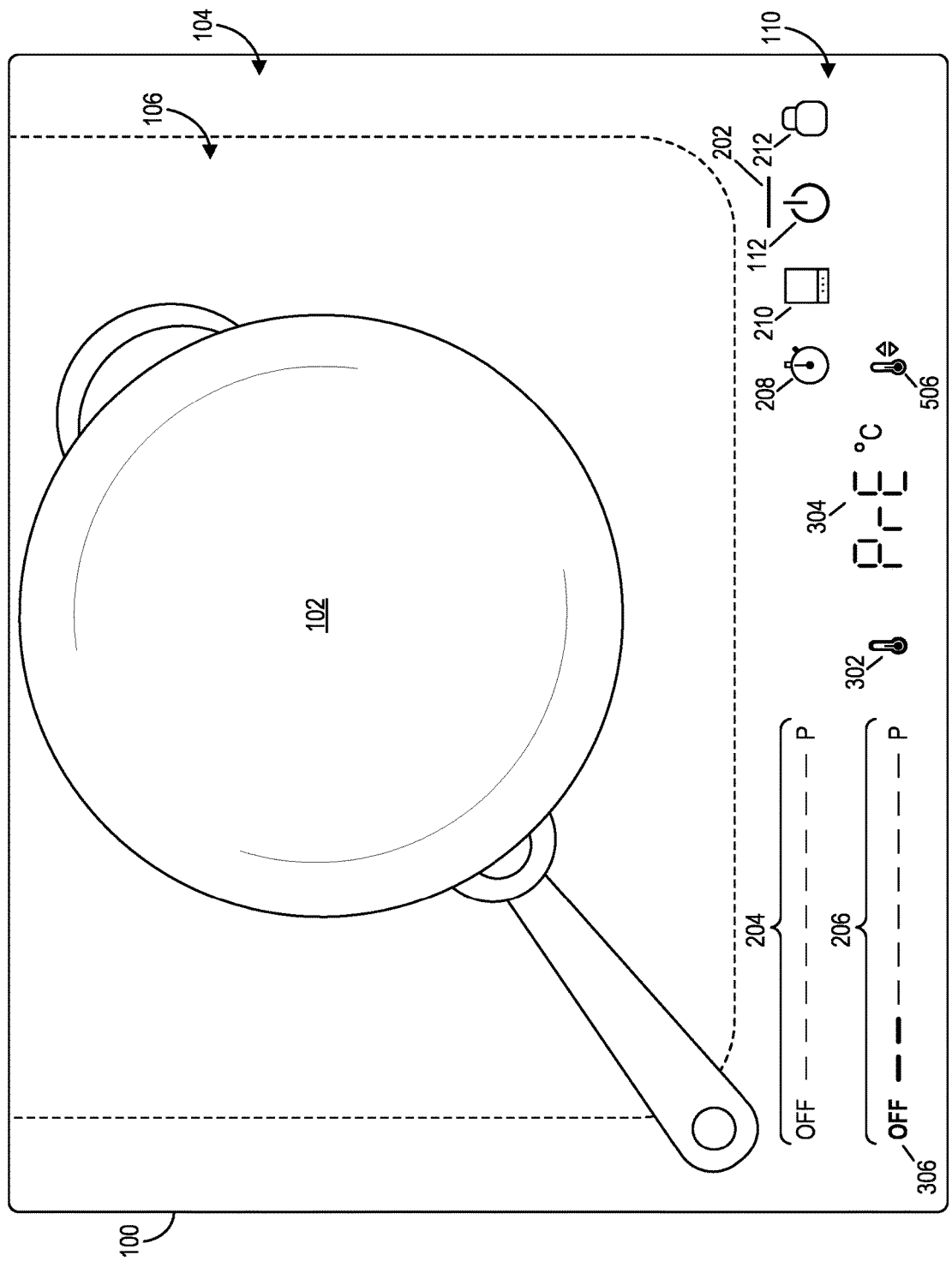
FIG. 6C illustrates a third top view of the induction cooktop showing a preheat function making use of the current status of the slider control and the numeric display.
Figure 6D:
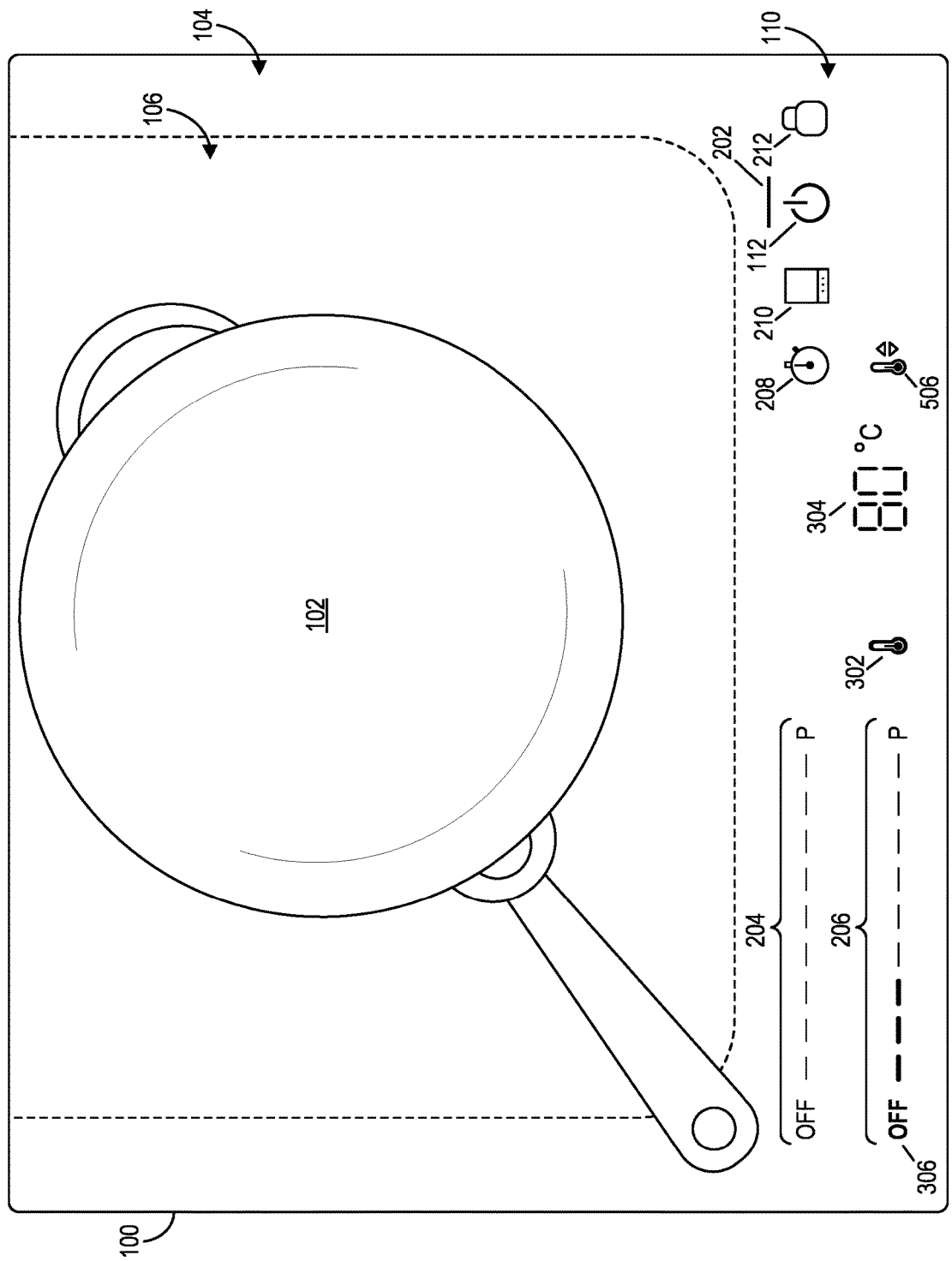
FIG. 6D illustrates a fourth top view of the induction cooktop showing a preheat function making use of the current status of the slider control and the numeric display.
Figure 6E:
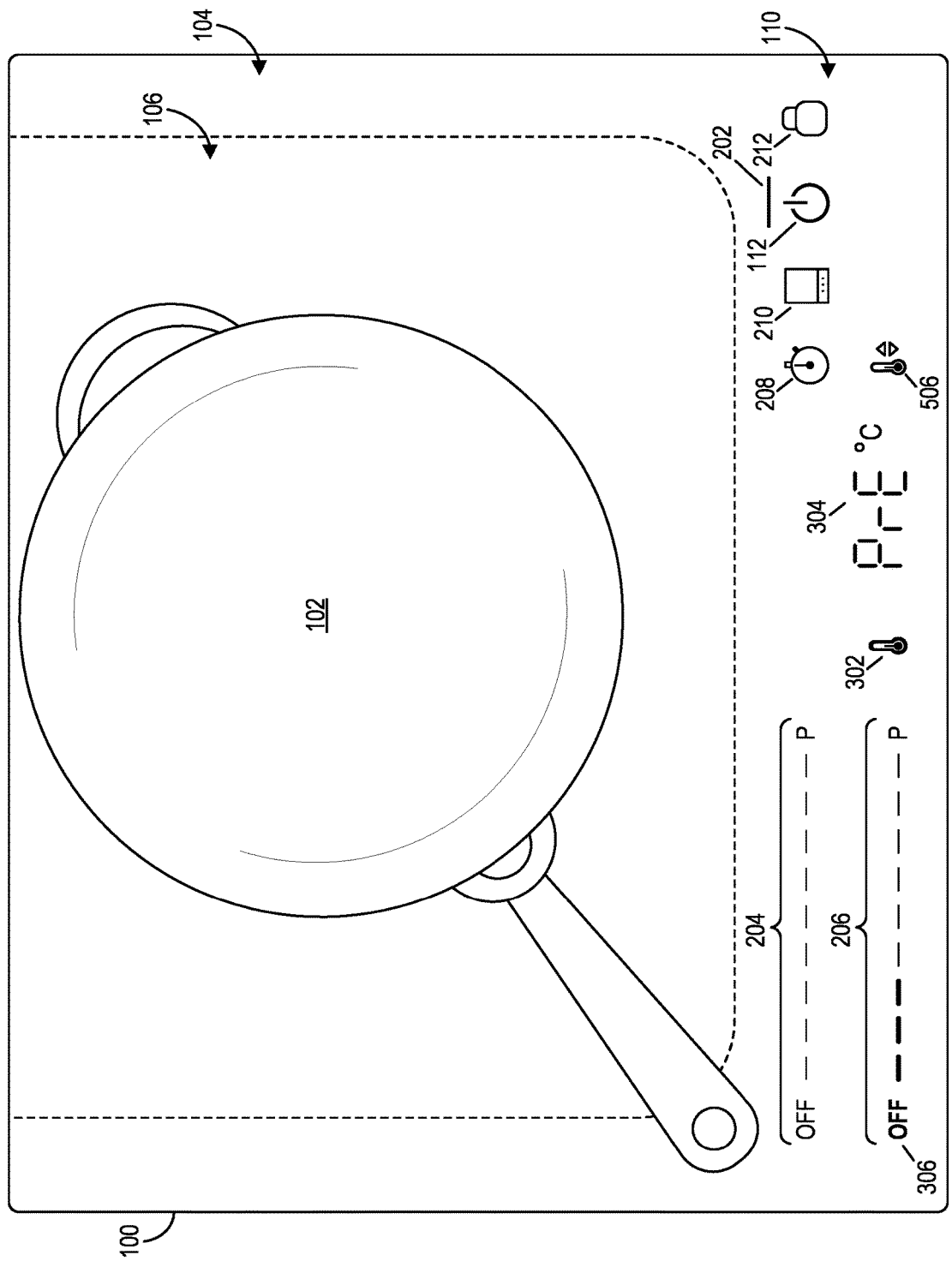
FIG. 6E illustrates a fifth top view of the induction cooktop showing a preheat function making use of the current status of the slider control and the numeric display.
Figure 6F:
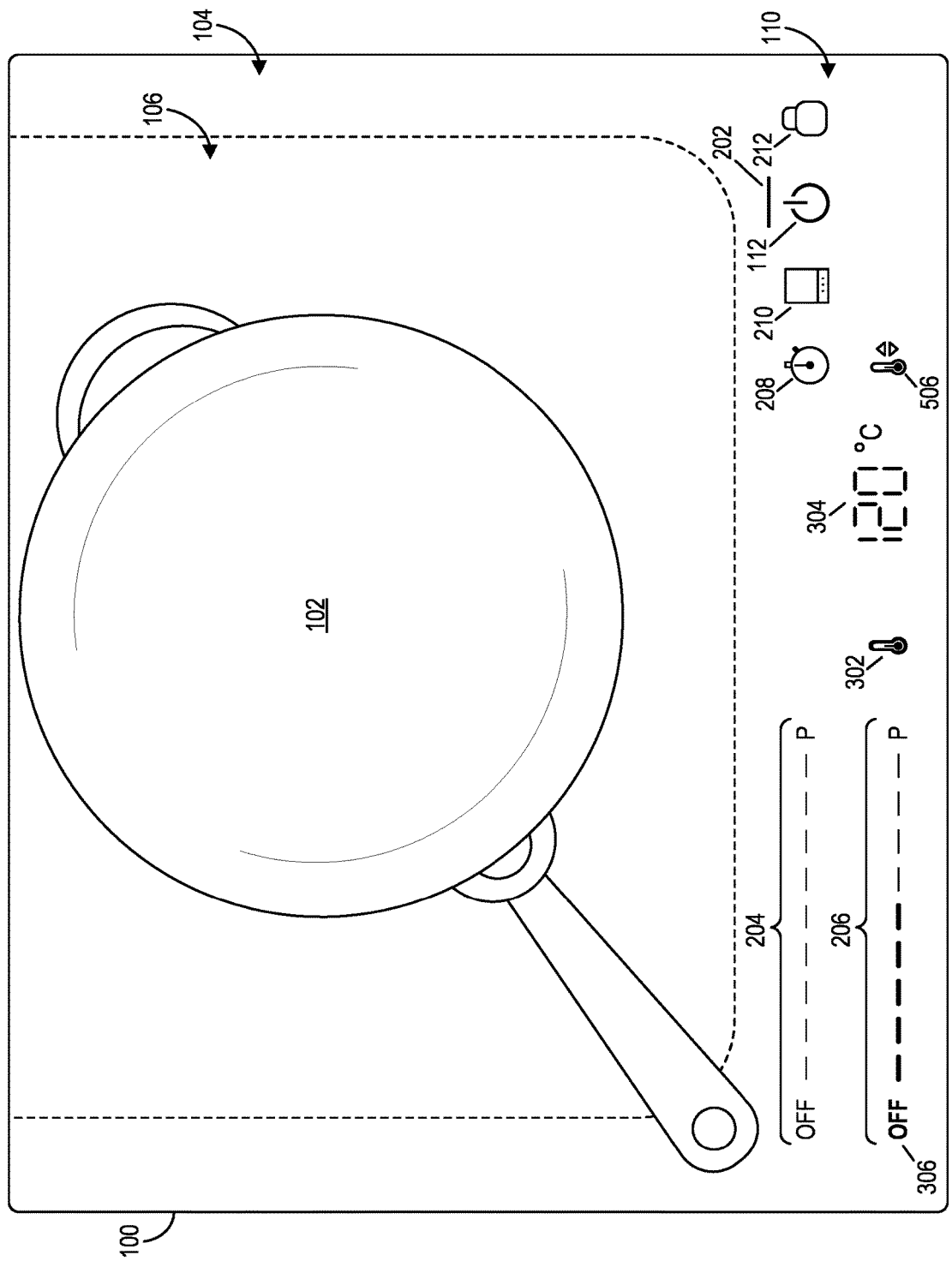
FIG. 6F illustrates a sixth top view of the induction cooktop showing a preheat function making use of the current status of the slider control and the numeric display.

The control panel 110 may also repurpose the slider control 206 to act as a progress bar to illustrate the progress of the preheating. Referring to FIG. 6A, the numeric display 304 indicates that the preheat is being performed, while the current status 306 of the slider control 206 indicates that the cooking utensil 102 is not yet heated. Referring to FIG. 6B, the numeric display 304 has transitioned to showing the current temperature is now 40 degrees, while the current status 306 of the slider control 206 indicates that the cooking utensil 102 has begun to be heated. Referring to FIG. 6C, the numeric display 304 has switched again to indicate preheat, while the current status 306 of the slider control 206 continues to indicate that the cooking utensil 102 has begun to be heated. Referring to FIG. 6D, the numeric display 304 has transitioned to showing the current temperature is now 80 degrees, while the current status 306 of the slider control 206 indicates that the cooking utensil 102 is heated to a greater extent than in FIG. 6B. Referring to FIG. 6E, the numeric display 304 has switched again to indicate preheat, while the current status 306 of the slider control 206 continues to indicate that the cooking utensil 102 is heated to the greater extent. This approach may continue until the desired temperature is reached, as shown in FIG. 6F. In a different, preferred, implementation, the system may make use of the full extent of the slider to show the progress. In this case, the progress would be represented by a single segment being lit for the initial (ambient) temperature, to all the segments being lit when reaching the target temperature (e.g., 120° C. in this example).

FIGS. 7A-7E collectively illustrate an example of use of the fine-tune adjustment mode 506 to make small adjustments to the temperature of the cooking utensil 102. As noted above, the fine-tune adjustment mode 506 allows the user to perform discrete step up and step down adjustments to adjust the current temperature setting.

Figure 7A:
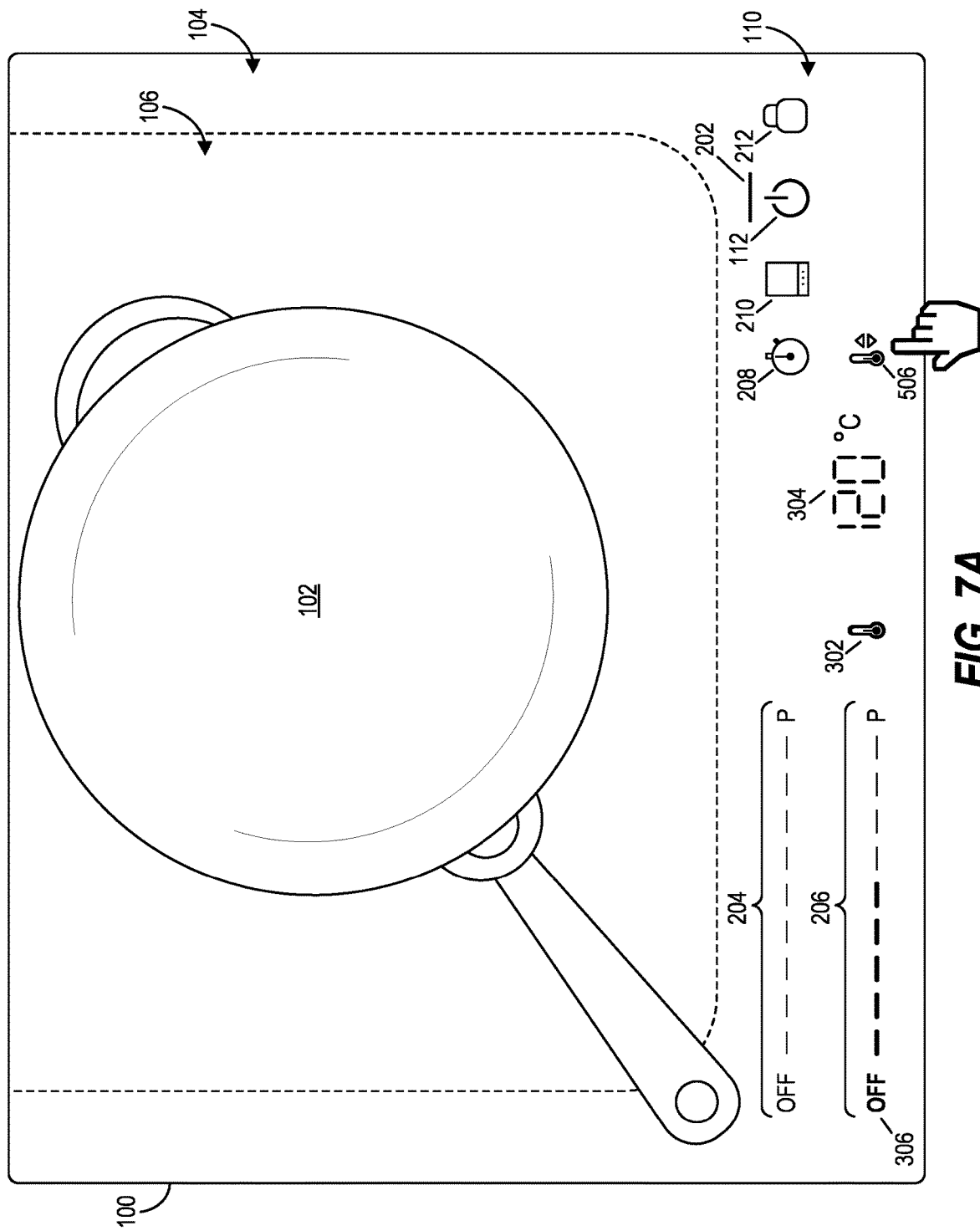
FIG. 7A illustrates a first top view of use of the fine-tune adjustment mode to make small adjustments to the temperature of the cooking utensil.

FIG. 7A shows the selected temperature of 120 degrees that was chosen in FIG. 5B and reached by preheat in FIG. 6F. However, the user may desire to make a small adjustment to the temperature. To do so, the user may select the fine-tune adjustment mode 506 from the control panel 110.

Figure 7B:
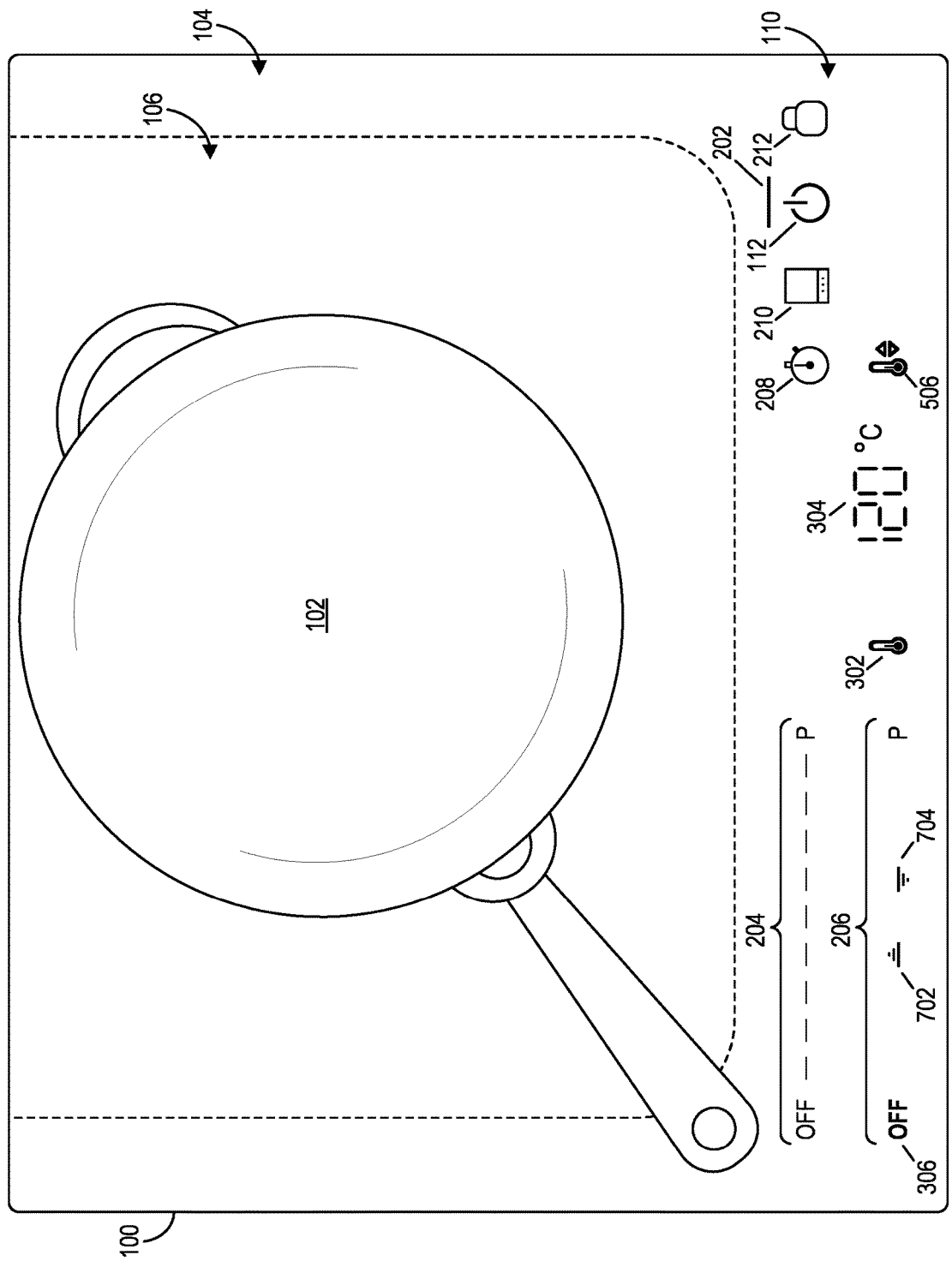
FIG. 7B illustrates a second top view of use of the fine-tune adjustment mode to make small adjustments to the temperature of the cooking utensil.

As shown in FIG. 7B, responsive to the selection of the fine-tune adjustment mode 506, the slider control 206 changes from a linear array of elements to a display of an up control 702 and a down control 704 as arrows. A segment of the linear array is used as the base of the arrow of the up control 702, while additional segments not used in the array are illuminated above the main segment to complete the arrow of the up control 702. Similarly, a second segment of the linear array is used as the base of the arrow of the down control 704, while additional segments are illuminated below the main segment to complete the down control 704.

Figure 7C:
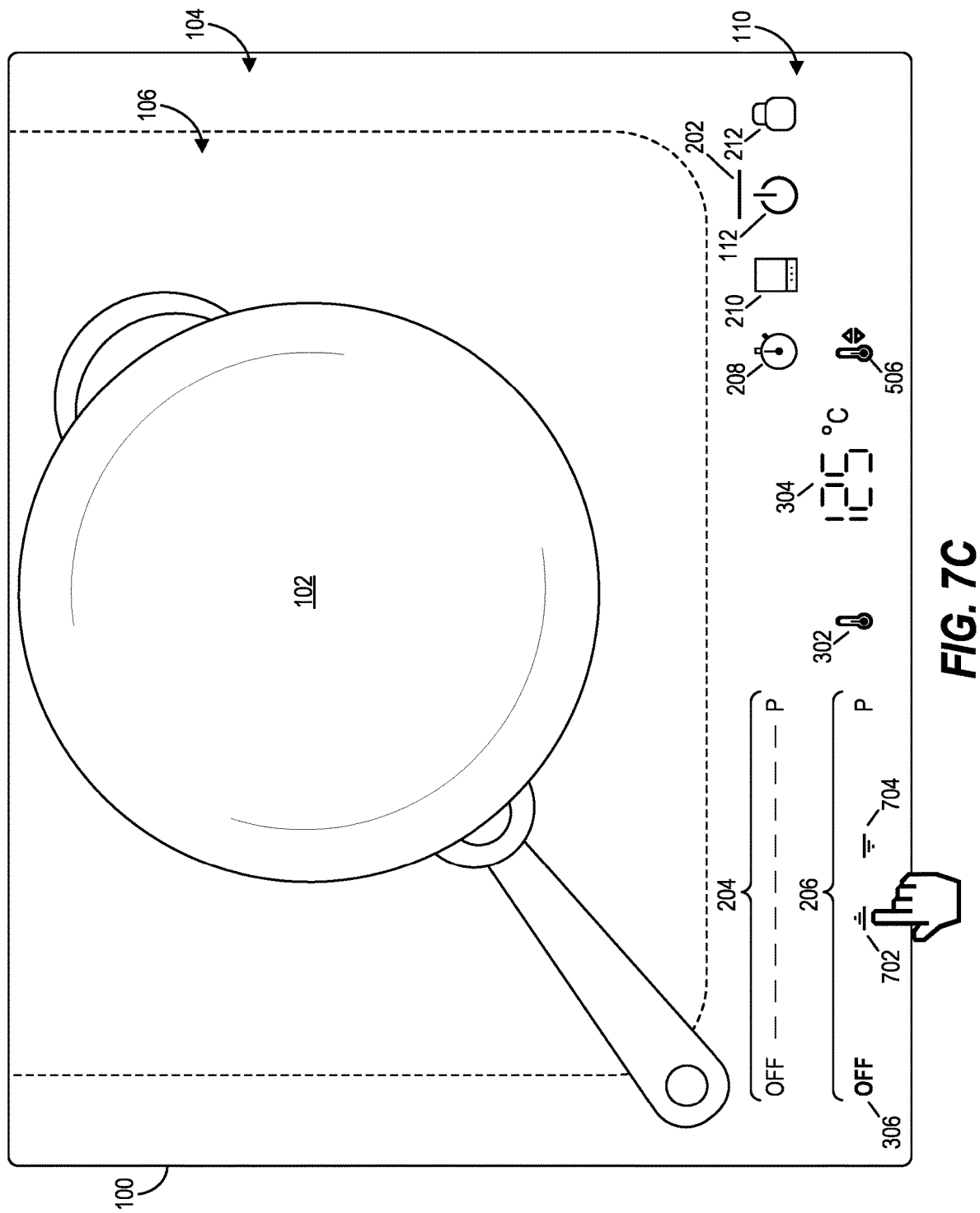
FIG. 7C illustrates a third top view of use of the fine-tune adjustment mode to make small adjustments to the temperature of the cooking utensil.
Figure 7D:
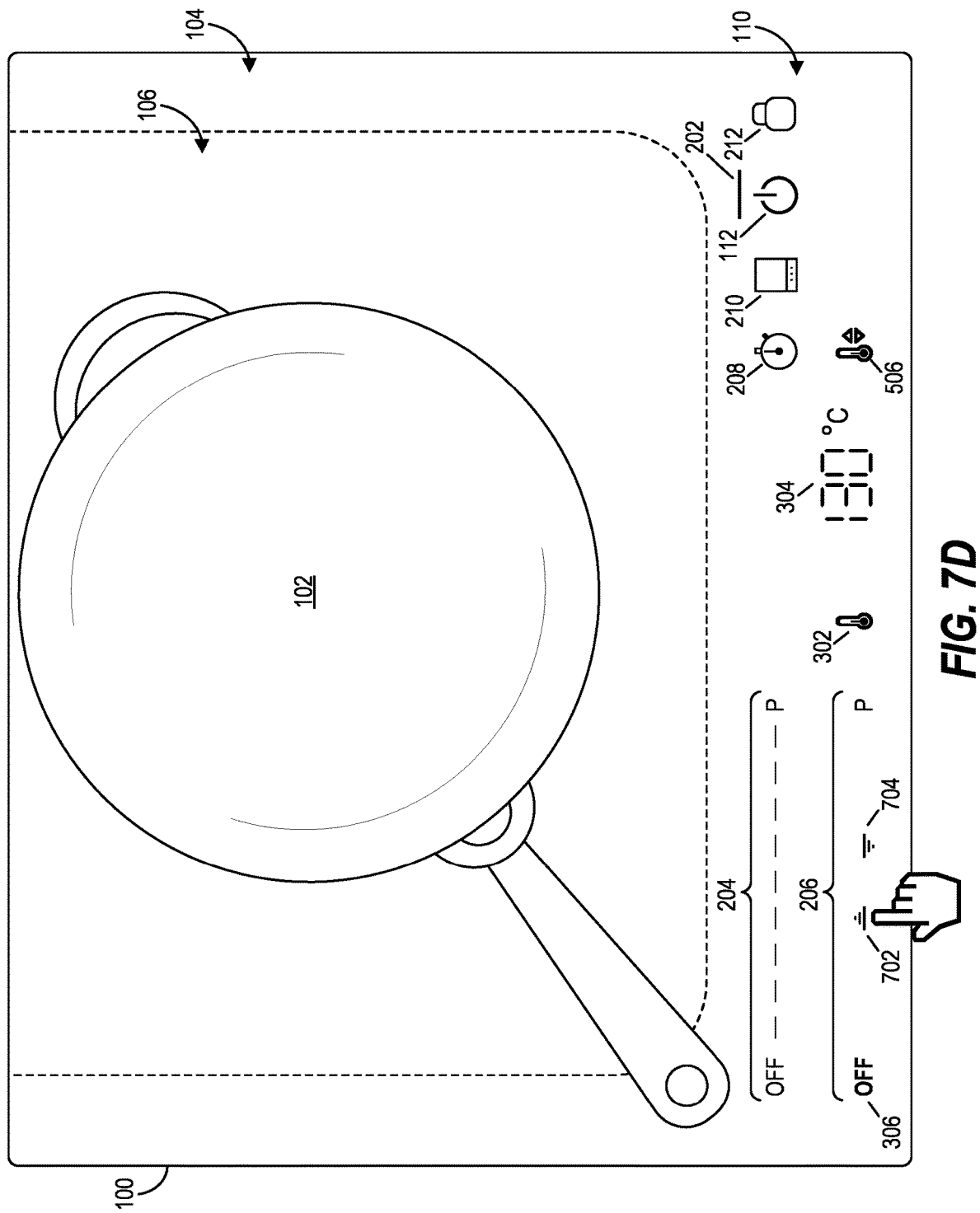
FIG. 7D illustrates a fourth top view of use of the fine-tune adjustment mode to make small adjustments to the temperature of the cooking utensil.
Figure 7E:
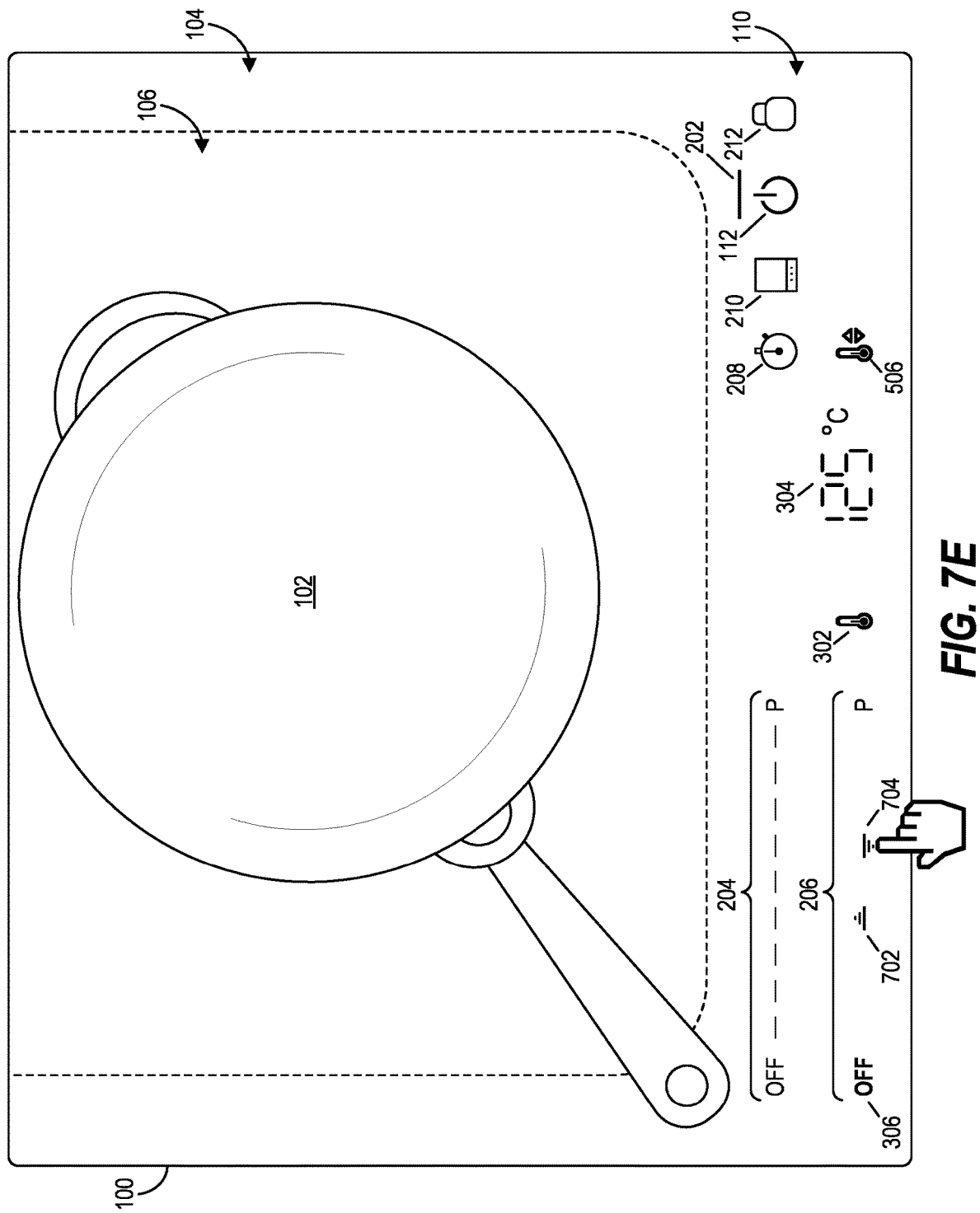
FIG. 7E illustrates a fifth top view of use of the fine-tune adjustment mode to make small adjustments to the temperature of the cooking utensil.

As shown in FIG. 7C, the user selects the up control 702 to fine tune the temperature in the upwards direction. Here, as indicated in the numeric display 304, the temperature has been increased from 120 degrees to 125 degrees. As shown in FIG. 7D, the user again selects the up control 702 to fine tune the temperature in the upwards direction. Here, as indicated in the numeric display 304, the temperature has been increased from 125 degrees to 130 degrees. As shown in FIG. 7E, the user selects the down control 704 to fine tune the temperature in the downward direction. Here, as indicated in the numeric display 304, the temperature has been decreased from 130 degrees back down to 125 degrees. Thus, by using the fine-tune adjustment mode 506, the user may use the slider control 206 to make small adjustments to the desired temperature.

Similarly, although not shown, the user may select the timer control 208 and may then use the slider control 206 to set the countdown time for the timer. Accordingly, the slider control 206 may also be used to set the timer value (either in the slide mode or in the fine tune mode). Once the timer is set, the slider control 206 may then be used to indicate the progress of the timer.

The progress bar may utilize the segments of the slider control 206 displayed in an on and dim condition to indicate the background of the bar, and therefore the area to be filled. The already completed part of the progress bar may be represented by the segments being on and bright. The bright section may increase in size, for example from left to right, as time progresses, at the expense of the dim section, until the slider control 206 is composed completely of bright segments.

The number of bright segments of the slider control 206 may be determined with a function such as shown in equation (1):

$$n_{bright} = \frac{T_{elapsed}}{T_{total}} \cdot n_{total} \qquad (1)$$

where:
$T_{total}$ is the total time duration of the current operation;
$T_{elapsed}$ is the time already elapsed in the current operation;
$n_{total}$ is the number of segments of the slider control 204, 206; and
$n_{bright}$ is the number of segments to display in the on or bright mode.

Since the result of equation (1) may yield a non-integer number, the actual result may be rounded, either upwards or downwards, to an integral number of segments.

In another example, certain cooking operations may have a duration which is determined by the cooktop. These may include, for example, an operation where the cooktop has to bring water to a boil or simmering tomato sauce until properly thickened. Such operations have, as their defining characteristics, the coincidence of the completion of the operation with a physical quantity reaching a certain value, for example the cooking utensil 102 reaching a temperature value set by the user. The quantities may be measured, or estimated, using various techniques by the induction cooktop 100, so that the induction cooktop 100 may estimate how long the operation will take. In such examples, equation (1) may be utilized with the estimated time to compute the number of segments of the progress.

In another example, the calculation of which fraction of the slider controls 204, 206 to show for the progress may be performed for a parameter other than time. This may be useful, for example, for a preheat operation where the cooking utensil 102 is specified to reach a certain temperature. For example, when a target temperature is set, the segments to display as progress to the target temperature may be determined using the equation (2):

$$n_{brigh} = \frac{T_{current} - T_{start}}{T_{set} - T_{start}} \cdot n_{total}$$

where:
$T_{start}$ is the initial temperature;
$T_{set}$ is the target temperature;
$T_{current}$ is the current measured or estimated temperature; and
$n_{brigh}$ is the number of segments to display in the on or bright mode.

In some examples, the rightmost segment in the bright section may be shown in the slider controls 204, 206 as blinking, either going from off to bright or from dim to bright, to provide feedback to the user that the process is still ongoing.

Figure 7F:
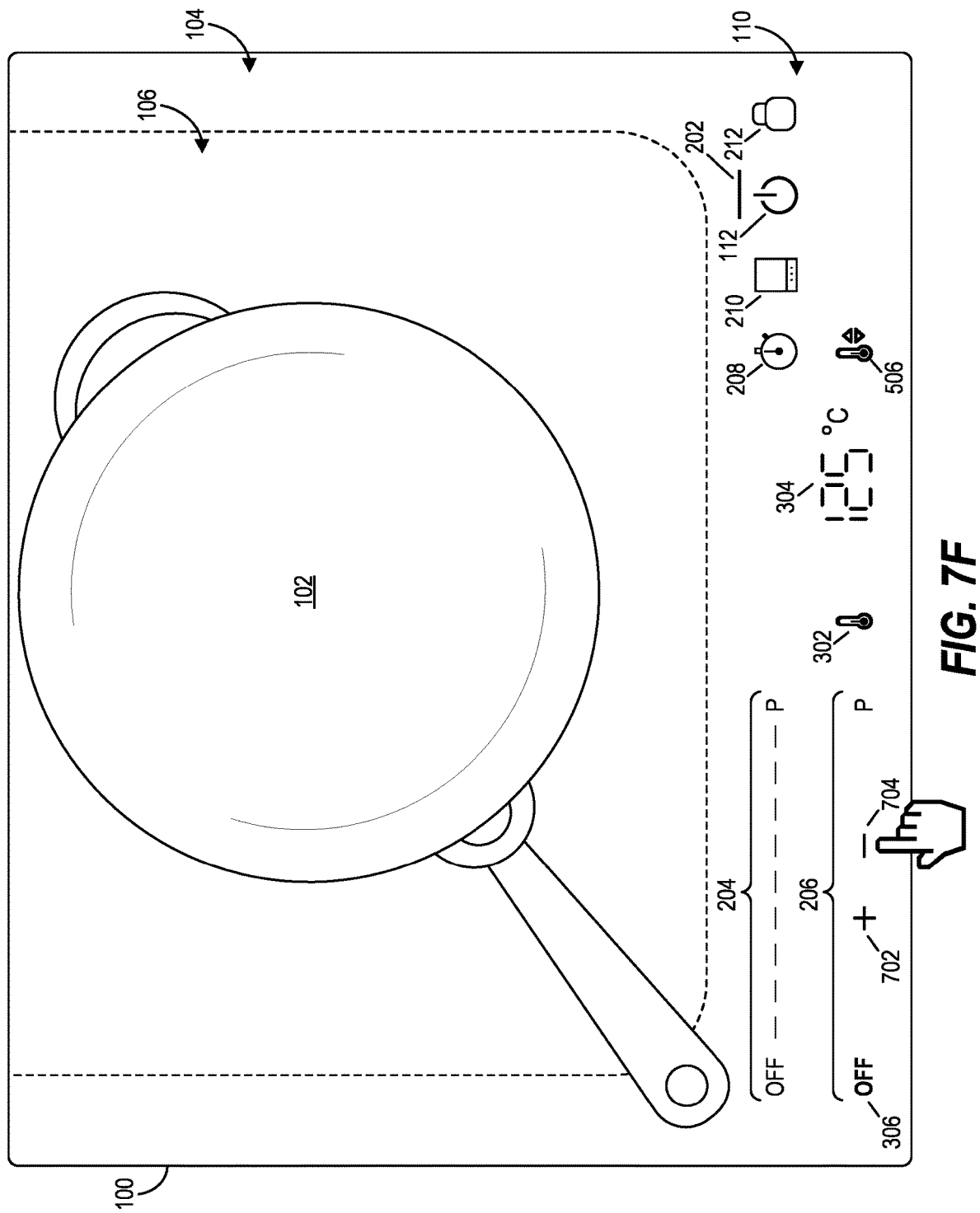
FIG. 7F illustrates a variation where the up control and the down control are illustrated as plus and minus controls.

FIG. 7F illustrates a variation where the up control 702 and the down control 704 are illustrated as plus and minus controls. In this variation, the horizontal segments are used for the minus and a portion of the plus, while an additional segment is lit up to provide the vertical bar portion of the plus.

Figure 8:
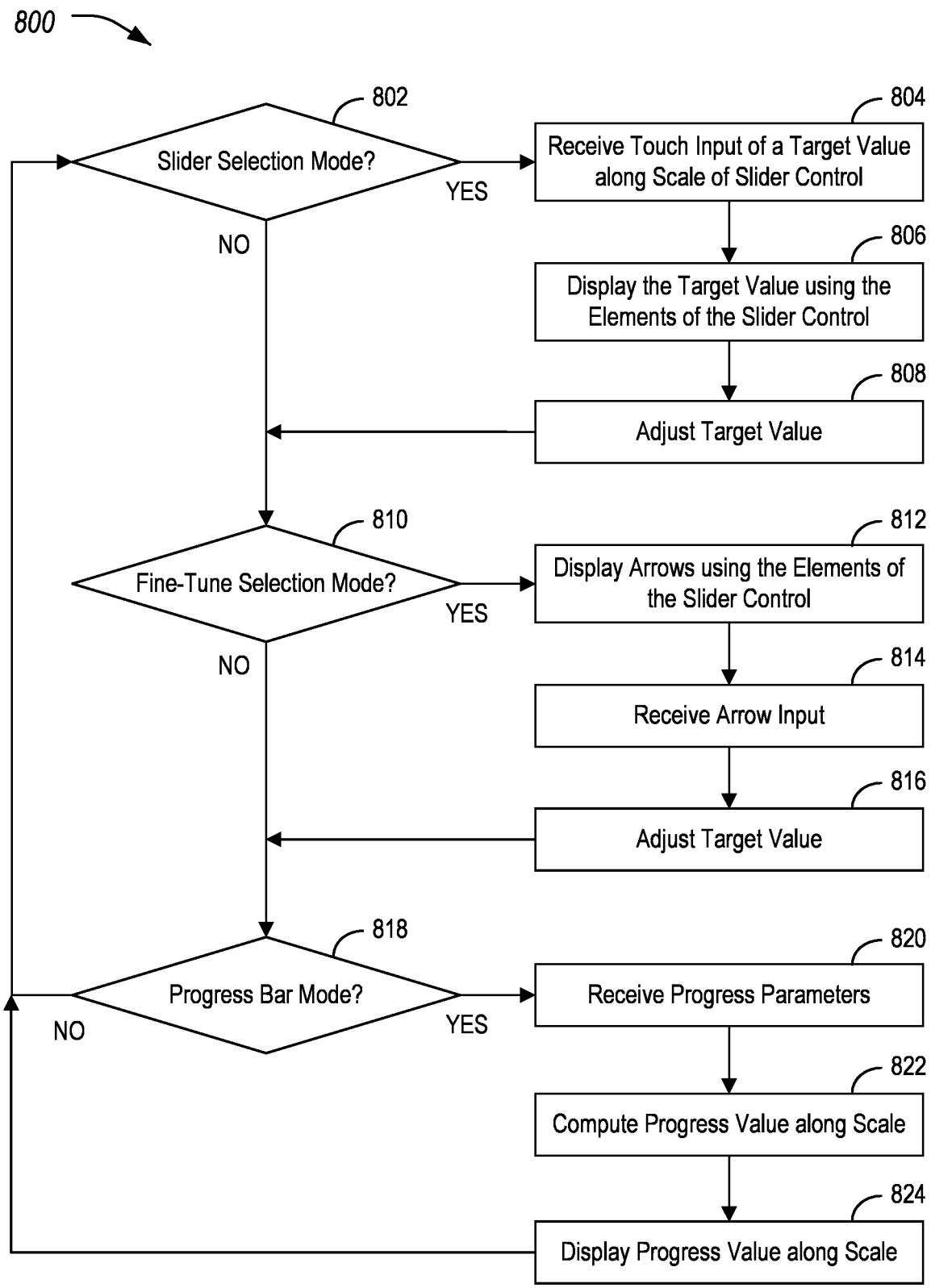
FIG. 8 illustrates an example process for providing a multi-function slider control user interface for the induction cooktop.

FIG. 8 illustrates an example process 800 for providing a multi-function slider control 204, 206 user interface for the induction cooktop 100. As shown, the process 800 illustrates the operation of the slider controls 204, 206 in (i) a slider selection mode (such as discussed with respect to FIGS. 5A-5B), (ii) a fine-tune selection mode (such as discussed with respect to FIGS. 7A-7F), and (iii) a progress bar display mode (such as discussed with respect to FIGS. 6A-6F). The controller 114 in the context of the induction cooktop 100 may implement the process 800 to allow the slider controls 204, 206 to perform the various modes as described herein.

At operation 802, the controller 114 determines whether the slider controls 204, 206 are operating in the slider selection mode. In an example, the slider controls 204, 206 may default to operation in the slider selection mode. For instance, the slider controls 204, 206 may be in the temperature slider selection mode responsive to selection of the temperature control 302. Or the slider controls 204, 206 may be in the power level slider selection mode responsive to deselection of the temperature control 302. Or the slider controls 204, 206 may be in the timer slider selection mode responsive to selection of the timer control 208. Responsive to the slider controls 204, 206 operating in the slider selection mode, control passes to operation 804. Otherwise, control passes to operation 810.

At operation 804, the controller 114 receives touch input of a target value along the scale of the slider control 204, 206. In an example, each slider control 204, 206 may include an array of individually controllable light elements defining a scale, wherein the slider controls 204, 206 are touch sensitive to receive selection of a value along the scale. The slider controls 204, 206 may receive user input of a desired value along the scale, such as shown in FIGS. 5A-5B.

At operation 806, the controller 114 displays the target value using the elements of the slider control 204, 206. In an example, the controller 114 may illustrate the value along the scale using the array of individually controllable light elements to provide visual feedback of the selection. This feedback is also shown in FIGS. 5A-5B.

At operation 808, the controller 114 adjusts the target value. In an example, responsive to the user input, the controller 114 adjusts the target temperature or other value being set in the slider selection mode. After operation 808, control passes to operation 810.

At operation 810, the controller 114 determines whether the slider controls 204, 206 are operating in the fine-tune selection mode. In an example, the controller 114 may receive input indicative of user selection to change into the fine-tune mode, such as selection of the fine-tune adjustment mode 506 for the target temperature as shown in FIG. 7A. In another example, the controller 114 may receive input indicative of user selection to set a timer using the fine-tune mode. Responsive to the slider controls 204, 206 operating in the fine-tune mode, control passes to operation 812. Otherwise, control passes to operation 818.

At operation 812, the controller 114 displays the control 702, 704 using the elements of the slider control 204, 206. For instance, responsive to the selection of the fine-tune adjustment mode 506, the slider control 206 changes from a linear array of elements to a display of an up control 702 and a down control 704. Segment of the linear array may be used as portions of the up and down controls 702, 704. Examples of such controls 702, 704 are shown in FIGS. 7B-7F.

At operation 814, the controller 114 receives input to the displayed controls 702, 704. For instance, input to the up controls 702 may cause the target value to be increased by a predefined value, such as 5 degrees, while input to the down controls 704 may cause the target value to be decreased by the same predefined value. Examples of receipt of such touch input are shown in FIGS. 7B-7D.

At operation 816, the controller 114 adjusts the target value. In an example, responsive to the user input, the controller 114 adjusts the target temperature or other value being set in the slider selection mode based on the input. After operation 816, control passes to operation 818.

At operation 818, the controller 114 determines whether the slider controls 204, 206 are operating in the progress bar display mode. In an example, the controller 114 may determine based on stored state information, that a preheat, timer, or other operation is being performed by the induction cooktop 100 that has progress associated with it from a start value to a target value. If so, control proceeds to operation 820. If not, control returns to operation 802.

At operation 820, the controller 114 receives progress parameters. For example, for a progress operation of a total time, the parameters may include $T_{total}$ as the total time duration of the current operation, $T_{elapsed}$ as the time already elapsed in the current operation, and $n_{total}$ as the number of segments of the slider control 204, 206. In another example, for a progress operation of reaching a target temperature, the parameters may include $T_{start}$ as the initial temperature, $T_{set}$ as the target temperature, $T_{current}$ as the current measured or estimated temperature, and $n_{brigh}$ as the number of segments to display in the on or bright mode.

At operation 822, the controller 114 computes a progress value along the scale of the slider control 204, 206. Examples of the computation of the progress value are discussed above with respect to Equations (1) and (2).

At operation 824, the controller 114 displays the progress value along the scale of the slider control 204, 206. This may include, as some example, to illustrate, using the progress bar, the progress of elapsed time in a preparation operation of predefined duration, the progress of elapsed time in a preparation operation of a duration estimated by the cooktop, or the progress of a temperature towards the value along the scale as set by the selection from the slider control 204, 206. In an example, the controller 114 may implement the progress bar with a first section of the individually controllable light elements signifying completed progress and a remaining, second section of individually controllable light elements signifying uncompleted progress. In an example, the controller 114 may implement the first section in a first brightness level, and implement the second section in a second brightness level, where in the first brightness level is greater than the second brightness level. The controller 114 is further configured to blink the light element of the first section adjacent to the second section to provide visual feedback that the progress from the first value to the second value is ongoing. FIGS. 6A-6F illustrate an example of display of progress to a target temperature. After operation 824, control returns to operation 802.

Thus, the disclosed approaches have several advantages over existing systems. For example, the disclosed approach allows the induction cooktop 100 to implement a progress bar on existing control panels 110 using the slider controls 204, 206, for no additional cost and without additional components. Also, the resultant user interface is advantageous to the user. The inclusion of a progress bar feature may convey additional information to the user about the progress of the operations in a friendly progress bar manner, which is a better visual indication of the progress of a process as compared to a numerical value on a numeric display 304.

Figure 9:
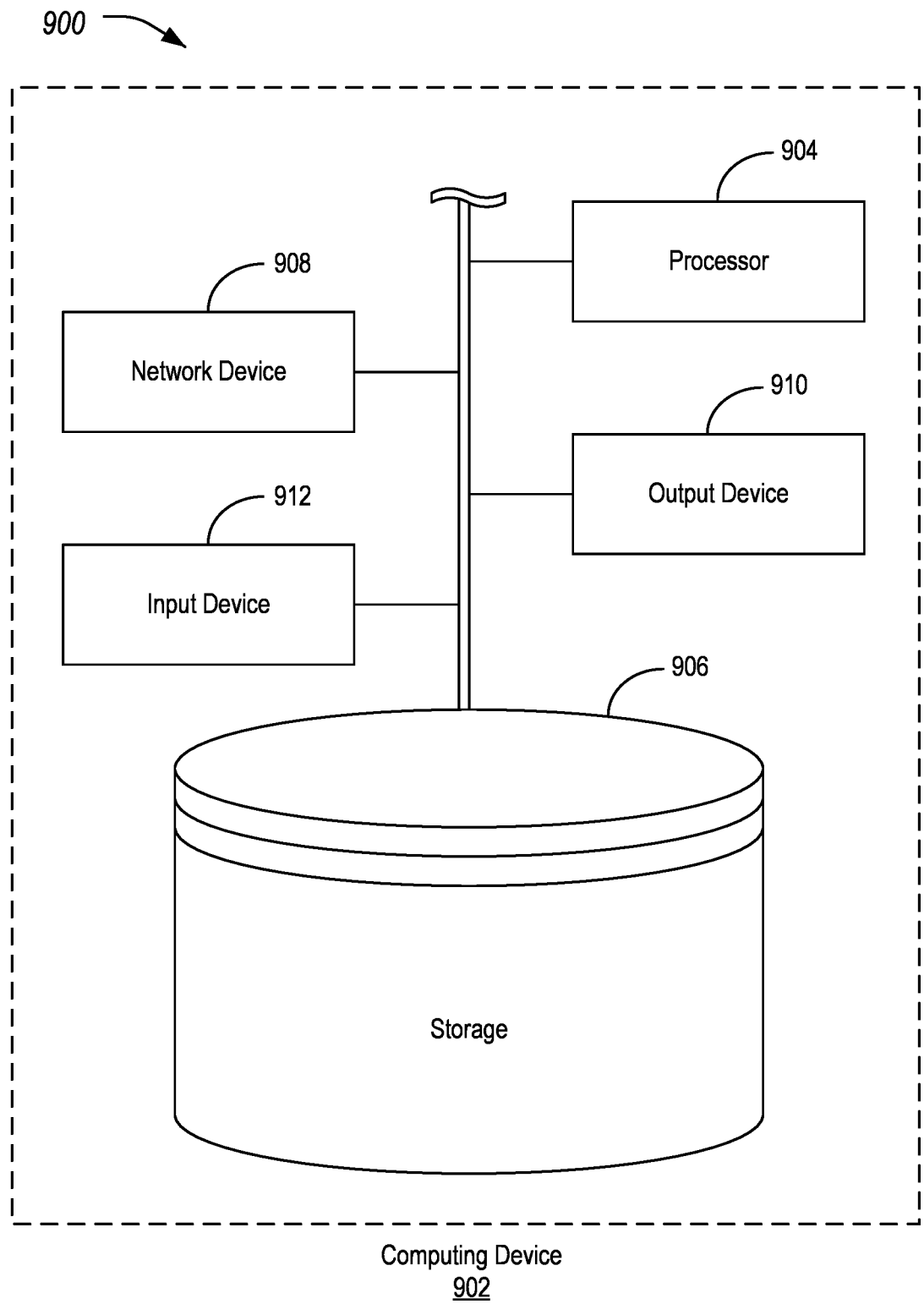
FIG. 9 illustrates an example of a computing device for use in the multi-function slider control user interface for the induction cooktop.

FIG. 9 illustrates an example 900 of a computing device 902 for use in the multi-function slider control 204, 206 user interface for the induction cooktop 100. Referring to FIG. 9, and with reference to FIGS. 1-8, the controller 114 may be an example of such a computing device 902. As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the induction cooktop 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display.

The input device 912 may include any of various devices that enable the computing device 902 to receive control input from users. Examples of suitable input devices that receive human interface inputs may include keyboards, mice, trackballs, touchscreens, voice input devices, graphics tablets, and the like.

The network devices 908 may each include any of various devices that enable the induction cooktop 100 to send and/or receive data from external devices over networks. Examples of suitable network devices 908 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for displaying a user interface having a multi-function slider control of a cooktop and a numeric display complementary to the slider control, the slider control comprising an array of individually controllable light elements defining a scale, the slider control being configured to be touch sensitive to receive selection of a target value along the scale, the method comprising:
   in a first mode, displaying the target value along the scale using the array of individually controllable light elements and numerically on the numeric display to provide visual feedback of the selection;
   in a second mode, displaying a progress bar indicating progress from a first value to a second value using the array of individually controllable light elements and further displaying the progress numerically on the numeric display; and
   in a third mode, displaying up and down controls using the array of individually controllable light elements to provide fine-tune adjustment to the target value, wherein a first segment of the array is used as at least a portion of the up control, and a second segment of the array is used as at least a portion of the down control, the up control for performing a discrete step up of the target value, the down control for performing a discrete step down of the target value.

2. The method of claim 1, further comprising implementing the progress bar with a first section of the individually controllable light elements signifying completed progress and a remaining, second section of individually controllable light elements signifying uncompleted progress.

3. The method of claim 2, further comprising implementing the first section in a first brightness level, and implementing the second section in a second brightness level, wherein the first brightness level is greater than the second brightness level.

4. The method of claim 2, further comprising blinking the light element of the first section adjacent to the second section to provide visual feedback that the progress from the first value to the second value is ongoing.

5. The method of claim 1, further comprising displaying, using the progress bar, the progress of elapsed time in a preparation operation of predefined duration.

6. The method of claim 1, further comprising displaying, using the progress bar, the progress of elapsed time in a preparation operation of a duration estimated by the cooktop.

7. The method of claim 1, further comprising displaying, using the progress bar, the progress of a temperature towards the value along the scale as set by the selection from the slider control or from direct access buttons corresponding to predefined cooking methods.

8. A multi-function slider control user interface for a cooktop, comprising:
   a slider control, comprising an array of individually controllable light elements defining a scale, wherein the slider control is configured to be touch sensitive to receive selection of a target value along the scale;
   a numeric display complementary to the slider control; and
   a controller, configured to
      in a first mode, display the target value along the scale using the array of individually controllable light elements and numerically on the numeric display to provide visual feedback of the selection,
      in a second mode, display a progress bar indicating progress from a first value to a second value using the array of individually controllable light elements and further display the progress numerically on the numeric display, and
      in a third mode, display up and down controls using the array of individually controllable light elements to provide fine-tune adjustment to the value, wherein a first segment of the array is used as at least a portion of the up control, and a second segment of the array is used as at least a portion of the down control, the up control configured to perform a discrete step up of the target value, the down control configured to perform a discrete step down of the target value.

9. The user interface of claim 8, wherein the controller is further configured to display the progress bar with a first section of the individually controllable light elements signifying completed progress and a remaining, second section of individually controllable light elements signifying uncompleted progress.

10. The user interface of claim 9, wherein the controller is further configured to display the first section in a first brightness level, and implement the second section in a second brightness level, where in the first brightness level is greater than the second brightness level.

11. The user interface of claim 9, wherein the controller is further configured to blink the light element of the first section adjacent to the second section to provide visual feedback that the progress from the first value to the second value is ongoing.

12. The user interface of claim 8, wherein the controller is further configured to display, using the progress bar, the progress of elapsed time in a preparation operation of predefined duration.

13. The user interface of claim 8, wherein the controller is further configured to display, using the progress bar, the progress of elapsed time in a preparation operation of a duration estimated by the cooktop.

14. The user interface of claim 8, wherein the controller is further configured to display, using the progress bar, the progress of a temperature towards the value along the scale as set by the selection from the slider control or from direct access buttons corresponding to predefined cooking methods.

15. The user interface of claim 8, wherein, in the third mode, the controller is further configured to:
   illuminate a first additional segment not used in the array, above the first segment of the array, to complete the arrow of the up control, and
   illuminate a second additional segment not used in the array, below the second segment of the array, to complete the arrow of the down control.

16. The user interface of claim 8, wherein, in the third mode, the controller is further configured to:
   illuminate an additional segment not used in the array, across the first segment of the array, to complete a plus symbol of the up control, and
   utilize the second segment of the array as a minus indication of the down control.

17. A non-transitory computer-readable medium comprising instructions that, when executed by a controller of a cooktop, cause the controller to control a slider control and a numeric display complementary to the slider control, the slider control comprising an array of individually controllable light elements defining a scale and configured to be touch sensitive to receive selection of a target value along the scale, to perform operations including to:
   in a first mode, display the target value along the scale using the array of individually controllable light elements and numerically on the numeric display to provide visual feedback of the selection;
   in a second mode, display, a progress bar indicating progress from a first value to a second value using the array of individually controllable light elements and further display the progress numerically on the numeric display; and
   in a third mode, display up and down controls using the array of individually controllable light elements to provide fine-tune adjustment to the value, wherein a first segment of the array is used as at least a portion of the up control, and a second segment of the array is used as at least a portion of the down control, the up control configured to perform a discrete step up of the target value, the down control configured to perform a discrete step down of the target value.

18. The medium of claim 17, further comprising instructions that, when executed by the controller, cause the controller to perform operations including to display the progress bar with a first section of the individually controllable light elements signifying completed progress and a remaining, second section of individually controllable light elements signifying uncompleted progress.

19. The medium of claim 18, further comprising instructions that, when executed by the controller, cause the controller to perform operations including to one or more of:
   display the first section in a first brightness level, and display the second section in a second brightness level, where in the first brightness level is greater than the second brightness level; and/or
   blink the light element of the first section adjacent to the second section to provide visual feedback that the progress from the first value to the second value is ongoing.

20. The medium of claim 17, further comprising instructions that, when executed by the controller, cause the controller to perform operations including to one or more of:
   display, using the progress bar, the progress of elapsed time in a preparation operation of predefined duration;
   display, using the progress bar, the progress of elapsed time in a preparation operation of a duration estimated by the cooktop; or
   display, using the progress bar, the progress of a temperature towards the value along the scale as set by the selection from the slider control.

\* \* \* \* \*